US012067941B2

(12) United States Patent
Kim et al.

(10) Patent No.: US 12,067,941 B2
(45) Date of Patent: Aug. 20, 2024

(54) PIXEL CIRCUIT AND DISPLAY PANEL INCLUDING SAME

(71) Applicant: LG Display Co., Ltd., Seoul (KR)

(72) Inventors: Chang Hee Kim, Paju-si (KR); Ki Min Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 17 days.

(21) Appl. No.: 17/855,152

(22) Filed: Jun. 30, 2022

(65) Prior Publication Data

US 2023/0008552 A1 Jan. 12, 2023

(30) Foreign Application Priority Data

Jul. 8, 2021 (KR) ........................ 10-2021-0090007
Dec. 8, 2021 (KR) ........................ 10-2021-0174815
Jun. 8, 2022 (KR) ........................ 10-2022-0069554

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0852* (2013.01); *G09G 2320/0233* (2013.01)

(58) Field of Classification Search
None
See application file for complete search history.

(56) References Cited

U.S. PATENT DOCUMENTS 10,192,486 B2 * 1/2019 He ........................ G09G 3/3208
2008/0111804 A1 * 5/2008 Choi .................... G09G 3/3233 345/205
2008/0224965 A1 * 9/2008 Kim ..................... G09G 3/3233 345/76
2009/0027310 A1 * 1/2009 Kim ..................... G09G 3/3233 345/76
2009/0146987 A1 * 6/2009 Kim ..................... G09G 3/3233 345/212
2009/0225011 A1 * 9/2009 Choi .................... G09G 3/3233 345/76
2010/0020059 A1 * 1/2010 Suh ...................... G09G 3/3233 345/212

(Continued)

FOREIGN PATENT DOCUMENTS

KR 10-2017-0080981 A 7/2017
KR 10-2020-0048652 A 5/2020
KR 10-2244932 B1 4/2021

*Primary Examiner* — Benjamin X Casarez
(74) *Attorney, Agent, or Firm* — Morgan, Lewis & Bockius LLP

(57) ABSTRACT

A pixel circuit and a display panel including the same may include a driving element including a gate connected to a first node to which a data voltage is configured to be applied, a first electrode connected to a high-potential voltage line, and a second electrode connected to a second node; a first switch element connected between the second node and a third node; a second switch element connected between the second node and a fourth node; a third switch element connected between the fourth node and a reference voltage line; a first capacitor connected between the first node and the third node; and a second capacitor connected between the third node and the fourth node.

22 Claims, 35 Drawing Sheets

(56) References Cited

U.S. PATENT DOCUMENTS

| | | | | |
|---|---|---|---|---|
| 2010/0220091 | A1* | 9/2010 | Choi | G09G 3/3233 345/82 |
| 2011/0102403 | A1* | 5/2011 | Kim | G09G 3/3233 345/76 |
| 2012/0038606 | A1* | 2/2012 | Kang | G09G 3/3233 345/204 |
| 2013/0162620 | A1* | 6/2013 | Kim | G09G 3/3233 345/212 |
| 2015/0154906 | A1* | 6/2015 | Chung | G09G 3/3233 345/212 |
| 2015/0170569 | A1* | 6/2015 | Han | G09G 3/3258 345/78 |
| 2015/0302798 | A1* | 10/2015 | Tan | G09G 3/3233 345/82 |
| 2015/0339973 | A1* | 11/2015 | Wu | G09G 3/3225 345/215 |
| 2015/0371606 | A1* | 12/2015 | Lee | G09G 3/3233 345/82 |
| 2016/0335954 | A1* | 11/2016 | Hung | G09G 3/3233 |
| 2019/0304368 | A1* | 10/2019 | Yang | G09G 3/3233 |
| 2020/0135091 | A1 | 4/2020 | Kim | |
| 2022/0208110 | A1* | 6/2022 | Yu | G09G 3/3266 |
| 2022/0284860 | A1* | 9/2022 | Lin | G09G 3/3266 |

* cited by examiner

PIXEL CIRCUIT AND DISPLAY PANEL INCLUDING SAME

CROSS-REFERENCE TO RELATED APPLICATIONS

This application claims priority to and the benefit of Korean Patent Application No. 10-2021-0090007, filed Jul. 8, 2021, Korean Patent Application No. 10-2021-0174815, filed Dec. 8, 2021, and Korean Patent Application No. 10-2022-0069554, filed Jun. 8, 2022, the disclosure of each of which is incorporated herein by reference in its entirety.

BACKGROUND

1. Technical Field

The present disclosure relates to a pixel circuit and a display panel including the same.

2. Discussion of Related Art

Display devices include a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast, luminous efficiency and luminance are high, and a viewing angle is large.

Some display devices, for example, a liquid crystal display device or an organic light emitting display device, include a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

Each of a plurality of pixels includes a driving element that controls a driving current flowing through an organic light emitting diode (OLED) according to a voltage (Vgs) between a gate electrode and a source electrode. Electrical characteristics of the driving element may deteriorate with the lapse of a driving time, thus varying for each pixel. Therefore, an OLED display compensates for deterioration of the driving element through an internal compensation scheme or an external compensation scheme.

SUMMARY

However, a loss in a data voltage may occur due to the influence of a parasitic capacitance generated in circuit wirings constituting the pixels and other circuit elements. Thus, a data transfer rate may decrease.

Accordingly, embodiments of the present disclosure are directed to a pixel circuit and a display panel including the same that substantially obviate one or more problems due to limitations and disadvantages of the related art.

It should be noted that aspects of the present disclosure are not limited to the above-described aspects. Additional features and aspects will be set forth in part in the description that follows, and in part will become apparent from the description, or may be learned by practice of the inventive concepts provided herein. Other features and aspects of the inventive concepts may be realized and attained by the structure particularly pointed out in, or derivable from, the written description, the claims hereof, and the appended drawings.

To achieve these and other aspect of the inventive concepts, as embodied and broadly described herein, a pixel circuit may include: a driving element including a gate connected to a first node to which a data voltage is configured to be applied, a first electrode connected to a high-potential voltage line, and a second electrode connected to a second node; a first switch element connected between the second node and a third node; a second switch element connected between the second node and a fourth node; a third switch element connected between the fourth node and a reference voltage line; a first capacitor connected between the first node and the third node; and a second capacitor connected between the third node and the fourth node.

In another aspect, a display panel may include a plurality of pixels configured to display an input image corresponding to a data voltage, each of the plurality of pixels including the above pixel circuit.

According to the present disclosure, it is possible to sufficiently compensate for a reduction in a threshold voltage of the driving element due to boosting loss by sensing a threshold voltage of a driving element twice or more, so that compensation performance by internal compensation can be improved.

The present disclosure can improve image quality by sufficiently compensating for a reduction in a threshold voltage of the driving element due to boosting loss and thus reducing a threshold voltage deviation of a driving element between pixels.

The effects of the present disclosure are not limited to the above-mentioned effects, and other effects that are not mentioned may be apparent to or understood by those skilled in the art from the following description and the appended claims.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
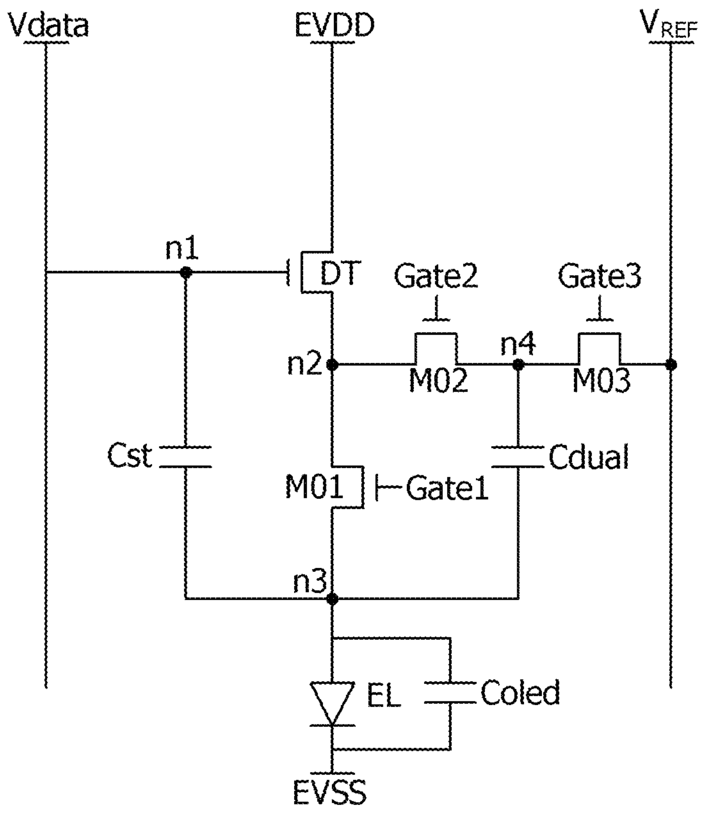
FIG. 1 is a diagram illustrating a pixel circuit according to a first example embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. The same or similar elements are designated by the same reference numerals throughout the specification unless otherwise specified.

In the following description, where the detailed description of the relevant known function or configuration may unnecessarily obscure an important point of the present disclosure, a detailed description of such known function or configuration may be omitted.

In the present specification, where the terms "comprise," "have," "include," and the like are used, one or more other elements may be added unless the term, such as "only," is used. An element described in the singular form is intended to include a plurality of elements, and vice versa, unless expressly stated otherwise or the context clearly indicates otherwise.

In construing an element, the element is to be construed as including an ordinary error or tolerance range even where no explicit description of such an error or tolerance range is provided.

In the description of the various embodiments of the present disclosure, where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," and the like may be used herein to describe various elements, the elements should not be limited by these terms as they are not used to define a particular order, precedence, or number of the corresponding elements. These terms are used only to identify one element from another. For example, a first element could be termed a second element, and similarly, a second element could be termed a first element, without departing from the scope of the present disclosure.

The same reference numerals may refer to substantially the same elements throughout the present disclosure unless otherwise specified.

Features of various embodiments of the present disclosure may be partially or entirely coupled to or combined with each other. They may be linked and operated technically in various ways as those skilled in the art can sufficiently understand. The embodiments may be carried out independently of or in association with each other in various combinations.

Reference will now be made in detail to embodiments of the present disclosure, examples of which may be illustrated in the accompanying drawings.

FIG. 1 is a diagram illustrating a pixel circuit according to a first example embodiment of the present disclosure, and FIGS. 2A to 3B are diagrams illustrating an internal compensation principle of a pixel circuit according to the first embodiment of the present disclosure.

As illustrated in FIGS. 1, 2A, 2B, 3A, and 3B, the pixel circuit according to an example embodiment of the present disclosure may include a light emitting element EL, a driving element DT for supplying a current to the light emitting element EL, a plurality of switch elements M01, M02, and M03 for switching current paths connected to the driving element DT, a first capacitor Cst for storing a gate-source voltage of the driving element DT, and a second capacitor Cdual. The driving element DT and the switch elements M01, M02, and M03 may each be implemented as an N-channel oxide TFT, but the present disclosure is not limited thereto.

The light emitting element EL may emit light by a current applied through a channel of the driving element DT according to a gate-source voltage Vgs of the driving element DT that varies according to a data voltage Vdata. The light emitting element EL may be implemented as an OLED including an organic compound layer formed between an anode and a cathode. The organic compound layer may include, but is not limited to, a hole injection layer (HIL), a hole transport layer (HTL), a light emitting layer (EML), an electron transport layer (ETL), and an electron injection layer (EIL). The anode of the light emitting element EL may be connected to the driving element DT through a third node n3, and the cathode of the light emitting element EL may be connected to a second power line to which a low-potential power voltage EVSS is applied.

An organic light emitting diode (OLED) used as the light emitting element EL may have a tandem structure in which a plurality of light emitting layers are stacked. The organic light emitting diode having the tandem structure may improve the luminance and lifespan of the pixel.

The driving element DT may drive the light emitting element EL by supplying a current to the light emitting element EL according to the gate-source voltage Vgs. The driving element DT may include a gate connected to a first node n1, a first electrode (or a drain) connected to a first power line to which a high-potential power voltage EVDD is applied, and a second electrode (or a source) connected to a second node n2.

A first switch element M01 may be turned on according to a gate-on voltage of a first gate signal GATE1 and connect the second electrode of the driving element DT to the anode of the light emitting element EL. The first switch element M01 may include a gate connected to a first gate line to which the first gate signal GATE1 is applied, a first electrode connected to the second node n2, and a second electrode connected to a third node n3.

A second switch element M02 may be turned on according to a gate-on voltage of a second gate signal GATE2 and connect the second node n2 connected to the second electrode of the driving element DT to a fourth node n4. The second switch element M02 may include a gate connected to a second gate line to which the second gate signal GATE2 is applied, a first electrode connected to the second node n2, and a second electrode connected to the fourth node n4.

A third switch element M03 may be turned on according to a gate-on voltage of a third gate signal GATE3 and connect the fourth node n4 to a reference voltage line. The third switch element M03 may include a gate connected to a third gate line to which the third gate signal GATE3 is applied, a first electrode connected to the fourth node n4, and a second electrode connected to the reference voltage line to which a reference voltage $V_{REF}$ is applied.

Figure 2A:
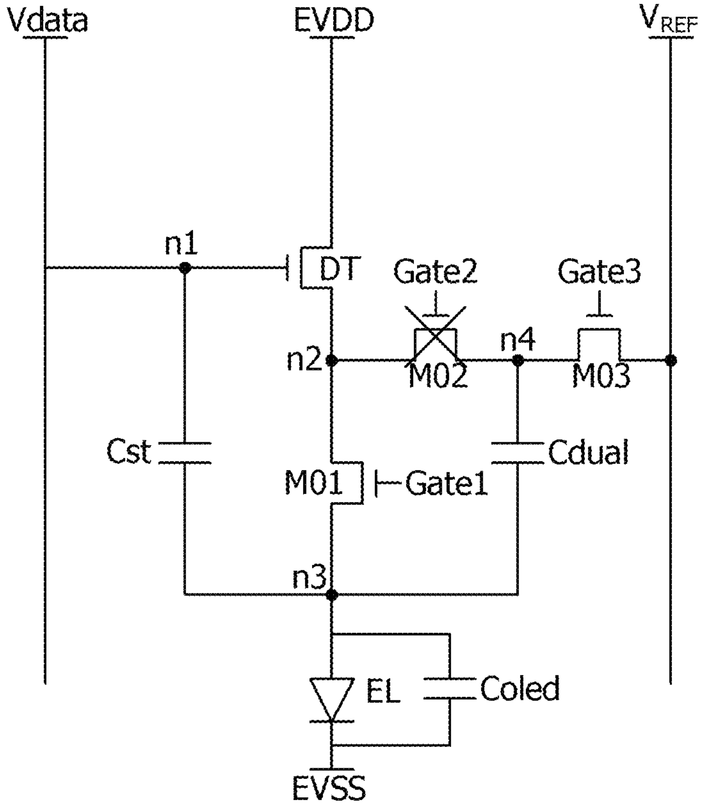
FIGS. 2A, 2B, 3A, and 3B are diagrams illustrating an internal compensation principle of a pixel circuit according to the first example embodiment of the present disclosure.
Figure 2B:
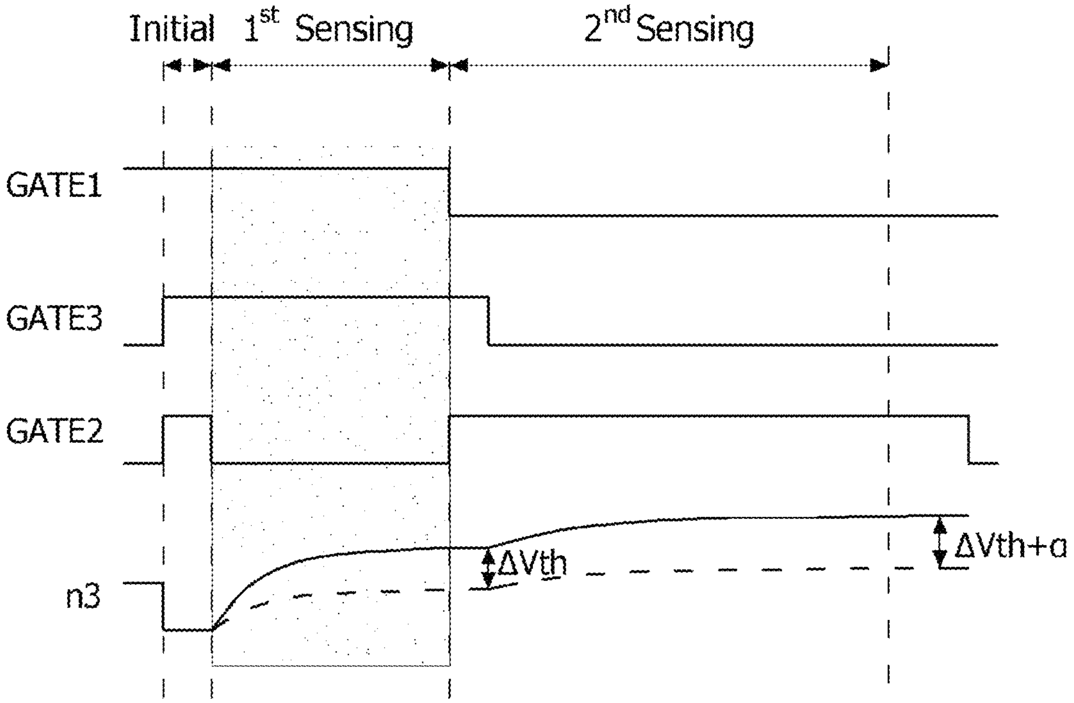

The first capacitor Cst may be connected between the first node n1 and the third node n3. The first capacitor Cst may charge the gate-source voltage Vgs of the driving element DT. As shown in FIGS. 2A and 2B, when the first switch element M01 and the third switch element M03 are turned on and the second switch element M02 is turned off in a first sensing period, the voltage of the third node n3 has a deviation of ΔVth, and the source voltage Vs of the driving element DT may rise to Vg−Vth, which is a difference between the gate voltage Vg and the threshold voltage Vth. At this time, the threshold voltage may be stored in the first capacitor Cst and be primarily compensated.

In this case, the voltage of the third node n3 is denoted by a solid line and a dotted line. This is to indicate a deviation of the threshold voltage Vth of the driving element DT, for example, a deviation between a solid line with Vth=0V and a dotted line with Vth=1V.

Figure 3A:
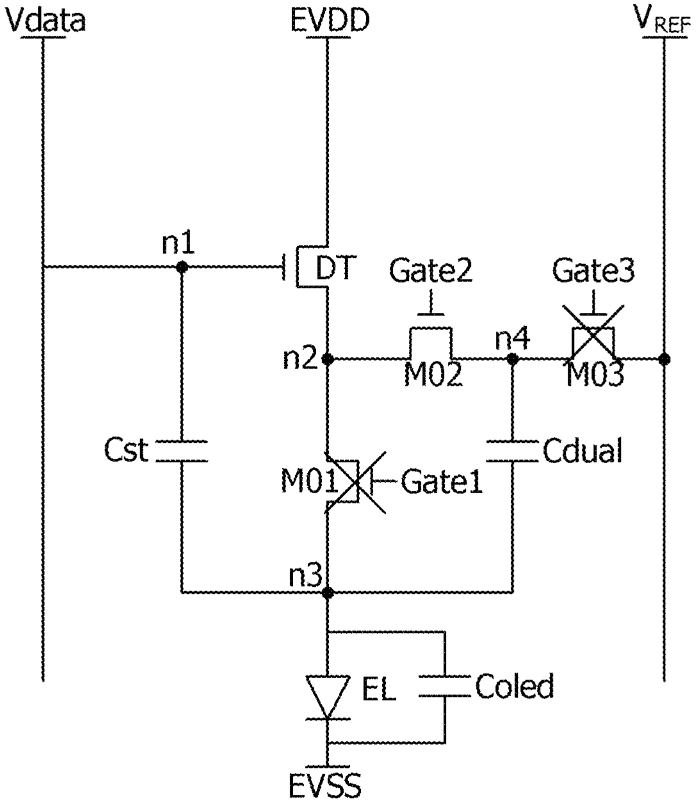
Figure 3B:
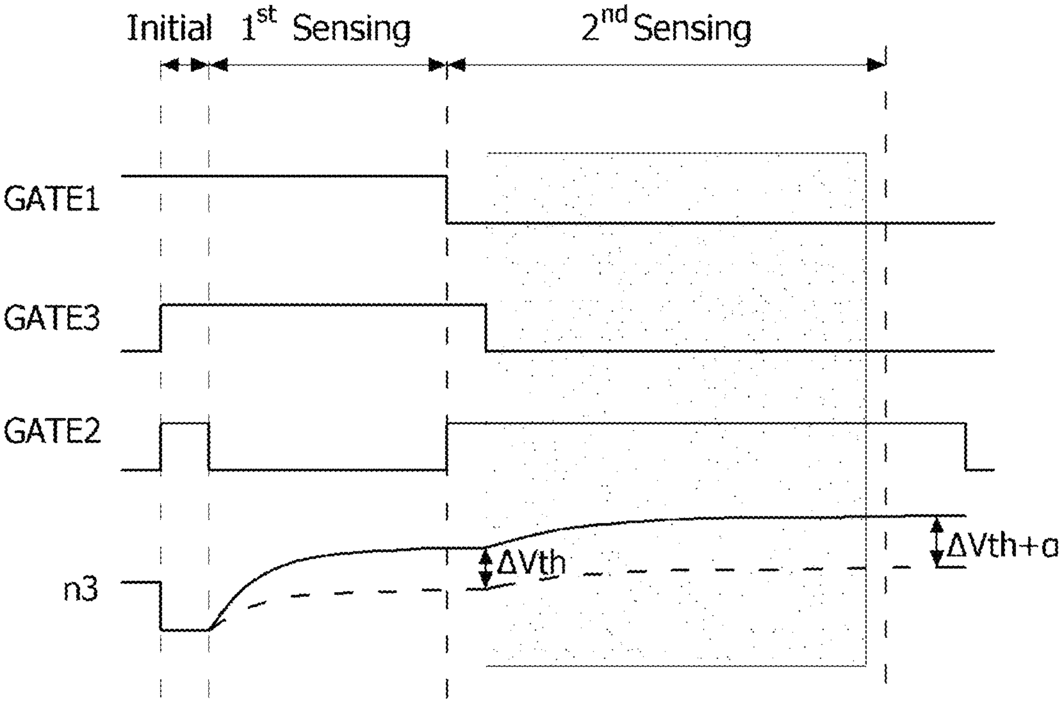

The second capacitor Cdual may be connected between the third node n3 and the fourth node n4. The second capacitor Cdual may transfer a predetermined compensation voltage α to the third node n3. As shown in FIGS. 3A and 3B, when the first switch element M01 and the third switch element M03 are turned off and the second switch element M02 is turned on in a second sensing period, the voltage of the fourth node n4 also has a deviation of ΔVth, and the compensation voltage α may be transferred to the third node n3 through the second capacitor Cdual. Therefore, the source voltage Vs of the driving element DT may rise to Vg−(Vth+α), which is a difference between the gate voltage Vg and the threshold voltage Vth+α, and at this time the threshold voltage may be stored in the first capacitor Cst and be secondarily compensated.

In this case, the compensation voltage α is a value for compensating for a boosting loss occurring in the boosting process. The compensation voltage α may vary depending on the time of the second sensing period.

Figure 4:
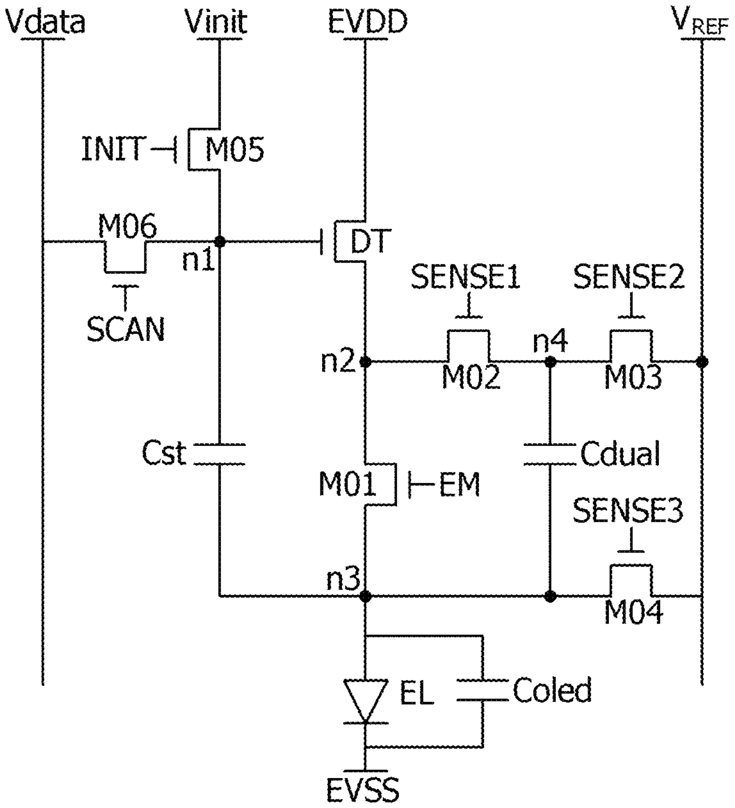
FIG. 4 is a diagram illustrating a pixel circuit according to a second example embodiment of the present disclosure.
Figure 5:
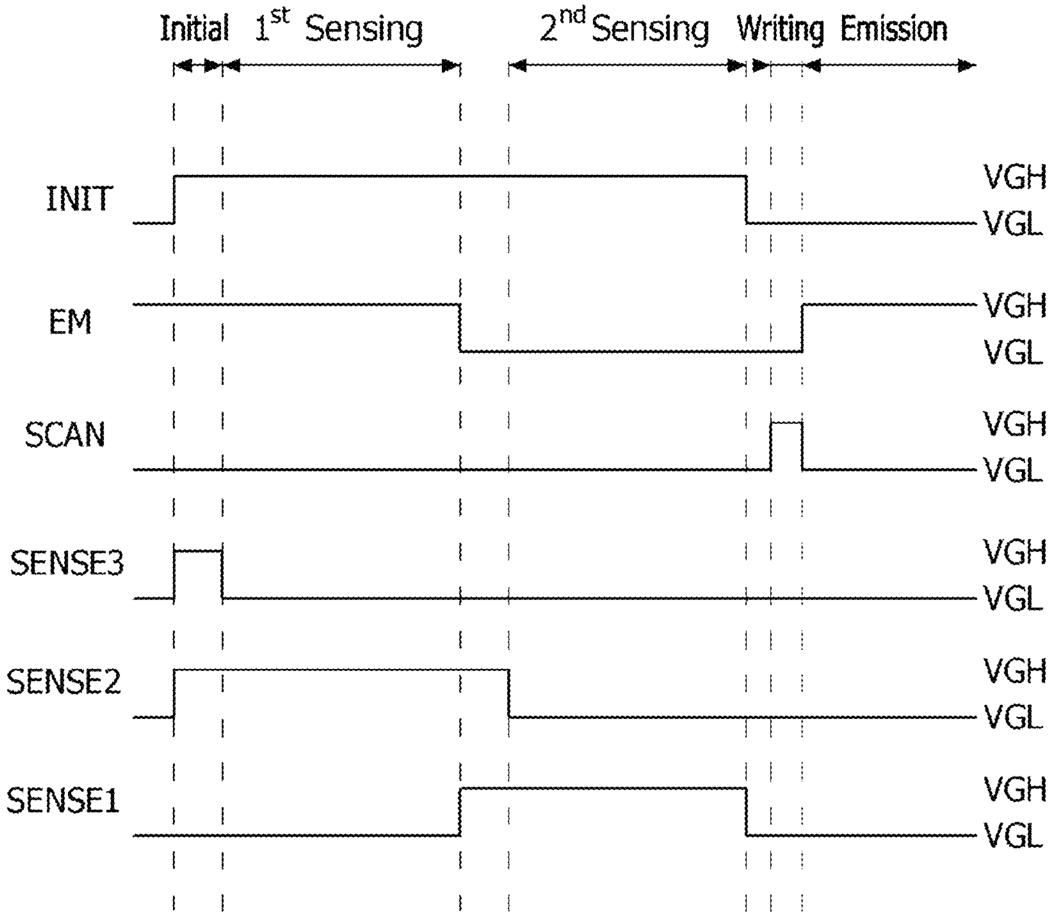
FIG. 5 is a diagram illustrating an example driving timing of the example pixel circuit shown in FIG. 4.

FIG. 4 is a diagram illustrating a pixel circuit according to a second example embodiment of the present disclosure. FIG. 5 is a diagram illustrating an example driving timing of the example pixel circuit shown in FIG. 4. FIGS. 6A to 10B are diagrams illustrating a driving principle of the example pixel circuit shown in FIG. 4.

As illustrated in FIG. 4, the pixel circuit according to the second example embodiment of the present disclosure may include a light emitting element EL, a driving element DT for supplying a current to the light emitting element EL, a plurality of switch elements M01, M02, M03, M04, M05, and M06 for switching current paths connected to the driving element DT, a first capacitor Cst for storing a gate-source voltage of the driving element DT, and a second capacitor Cdual. The driving element DT and the switch elements M01, M02, M03, M04, M05, and M06 may each be implemented as an N-channel oxide TFT, but the present disclosure is not limited thereto.

A first switch element M01 may be turned on according to a gate-on voltage of an EM signal EM and connect the second electrode of the driving element DT to the anode of the light emitting element EL. The first switch element M01 may include a gate connected to a first gate line to which the EM signal is applied, a first electrode connected to the second node n2, and a second electrode connected to a third node n3.

A second switch element M02 may be turned on according to a gate-on voltage of a first sensing signal SENSE1 and connect the second node n2 connected to the second electrode of the driving element DT to a fourth node n4. The second switch element M02 may include a gate connected to a second gate line to which the first sensing signal SENSE1 is applied, a first electrode connected to the second node n2, and a second electrode connected to the fourth node n4.

A third switch element M03 may be turned on according to a gate-on voltage of a second sensing signal SENSE2 and connect the fourth node n4 to a reference voltage line to apply a reference voltage $V_{REF}$. The third switch element M03 may include a gate connected to a third gate line to which the second sensing signal SENSE2 is applied, a first electrode connected to the fourth node n4, and a second electrode connected to the reference voltage line to which the reference voltage $V_{REF}$ is applied.

A fourth switch element M04 may be turned on according to a gate-on voltage of a third sensing signal SENSE3 and connect the reference voltage line to the third node n3 to apply the reference voltage. The fourth switch element M04 includes a gate connected to a fourth gate line to which the third sensing signal SENSE3 is applied, a first electrode connected to the third node n3, and a second electrode connected to the reference voltage line to which the reference voltage $V_{REF}$ is applied.

A fifth switch element M05 may apply an initialization voltage Vinit in response to an initialization signal INIT. In this case, the initialization voltage Vinit may be applied to the first node n1 through an initialization voltage line. The fifth switch element M05 may include a gate to which the initialization signal INIT is applied, a first electrode connected to the initialization voltage line, and a second electrode connected to the first node n1.

A sixth switch element M06 may be turned on according to a gate-on voltage of a scan signal SCAN and connect a data voltage line to the first node n1 to apply a data voltage Vdata. The sixth switch element M06 may include a gate connected to a fifth gate line to which the scan signal SCAN is applied, a first electrode connected to the data voltage line to which the data voltage Vdata is applied, and a second electrode connected to the first node n1.

As shown in FIG. 5, in the first sensing period, the first switch element M01, the third switch element M03, and the fifth switch element M05 are turned on, and the second switch element M02, the fourth switch element M04, and the sixth switch element M06 are turned off.

In the second sensing period, the second switch element M02 and the fifth switch element M05 are turned on, and the first switch element M01, the third switch element M03, the fourth switch element M04, and the sixth switch element M06 are turned off.

Figure 6A:
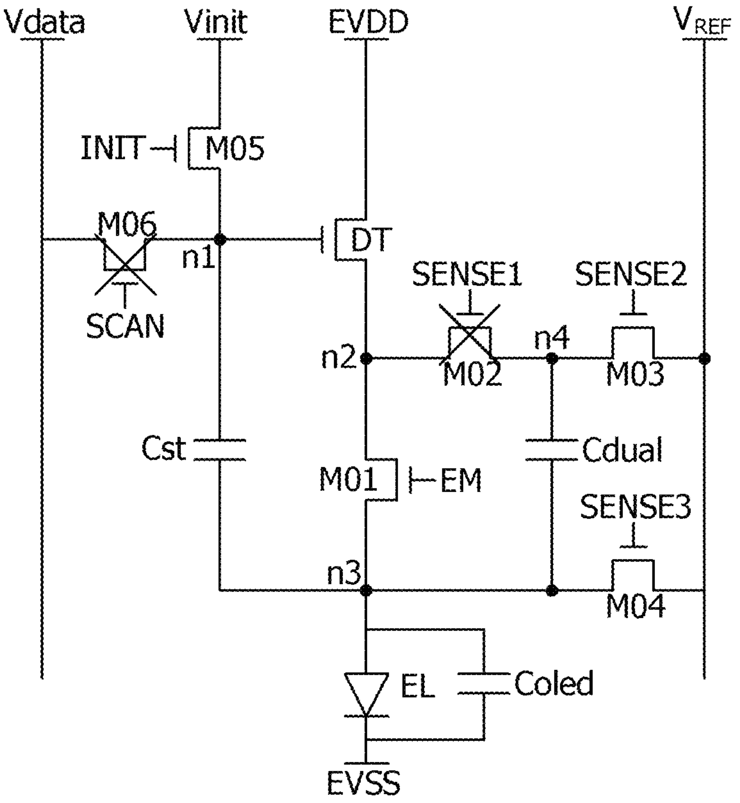
FIGS. 6A to 10B are diagrams illustrating a driving principle of the example pixel circuit shown in FIG. 4.
Figure 6B:
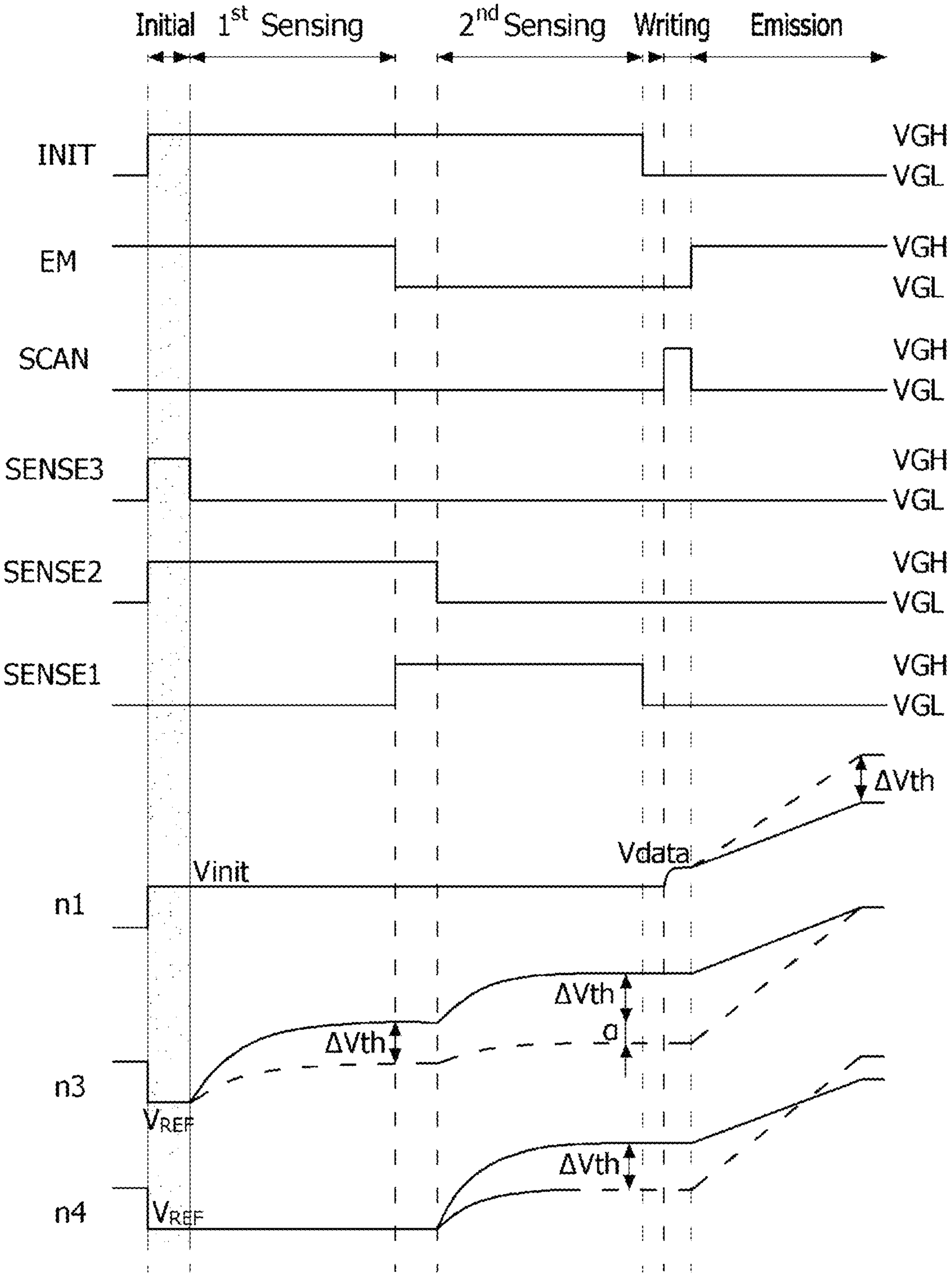

As shown in FIGS. 6A and 6B, in an initialization period, the first switch element M01, the third switch element M03, the fourth switch element M04, and the fifth switch element M05 are turned on, and the second switch element M02 and the sixth switch element M06 are turned off. The initialization voltage is applied to the first node n1 through the fifth switch element M05. The reference voltage is applied to the third node n3 and the fourth node n4 through the fourth switch element M04 and the third switch element M03, respectively.

Figure 7A:
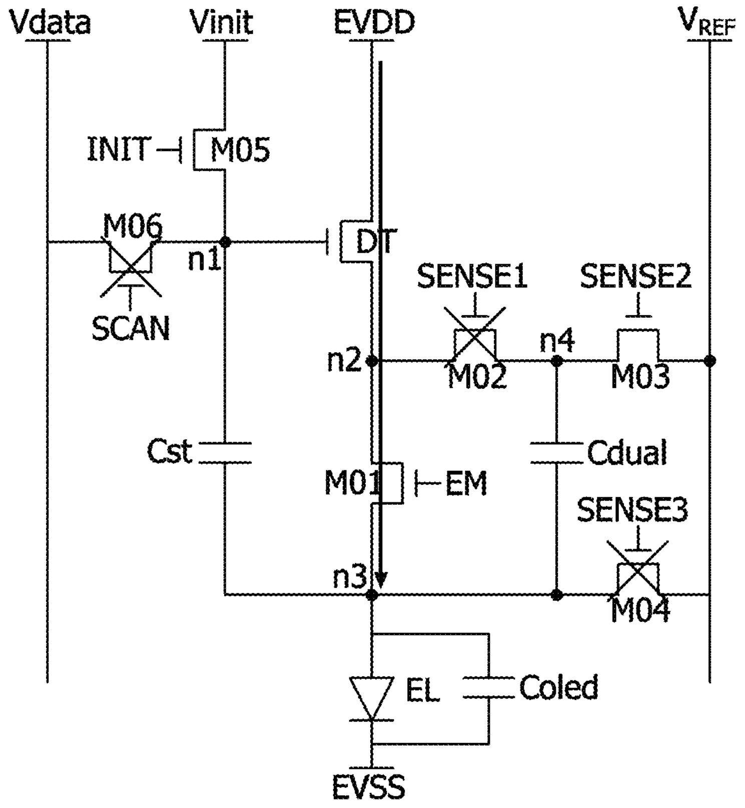
Figure 7B:
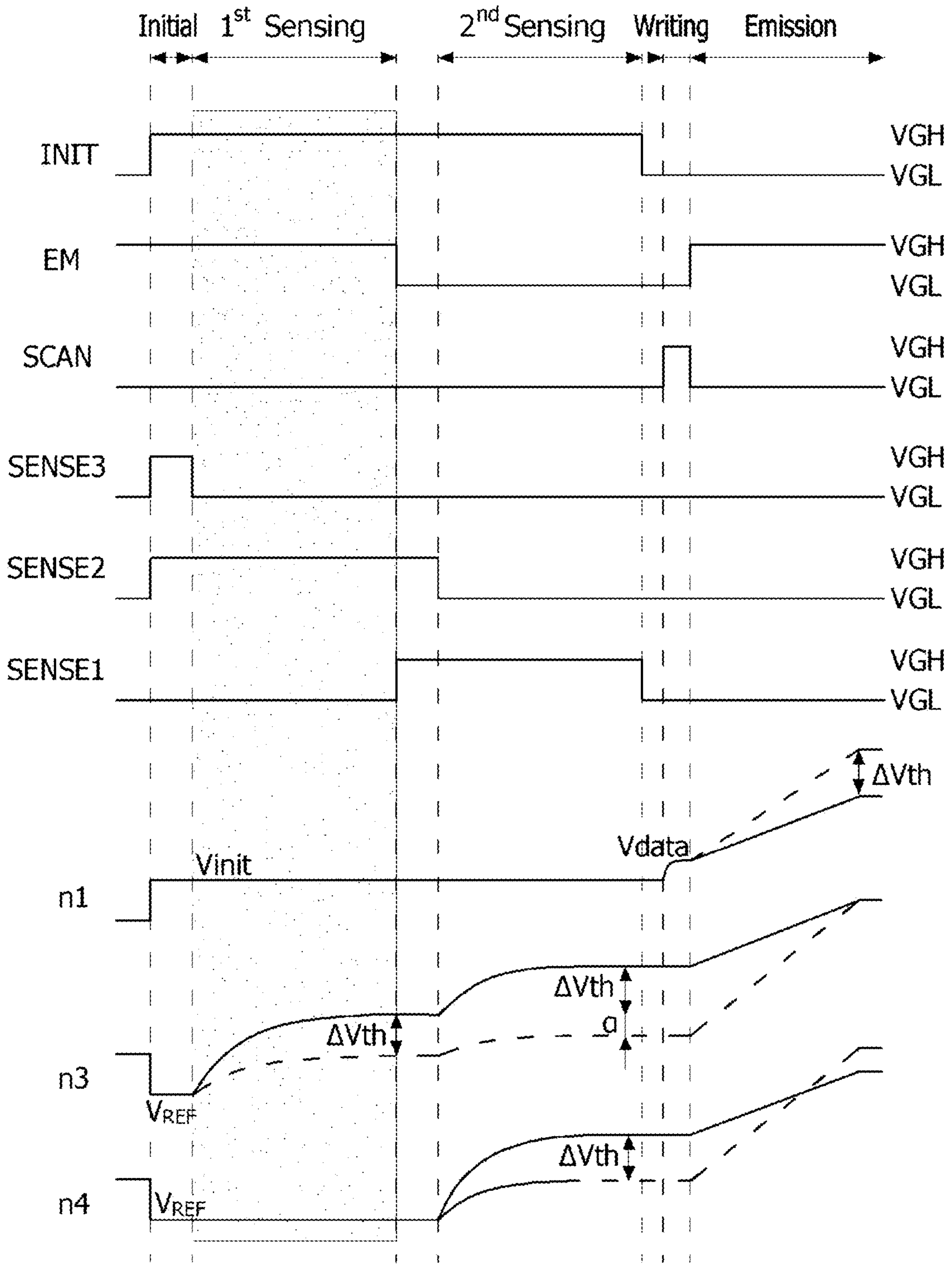

As shown in FIGS. 7A and 7B, in the first sensing period, the first switch element M01, the third switch element M03, and the fifth switch element M05 are turned on, and the second switch element M02, the fourth switch element M04, and the sixth switch element M06 are turned off.

The voltage of the third node n3 has a deviation of ΔVth due to a current flowing through the driving element DT. The source voltage Vs of the driving element DT may rise to the difference Vg−Vth, which is a difference between the gate voltage Vg and the threshold voltage Vth. At this time, the threshold voltage may be stored in the first capacitor Cst and be primarily compensated.

Figure 8A:
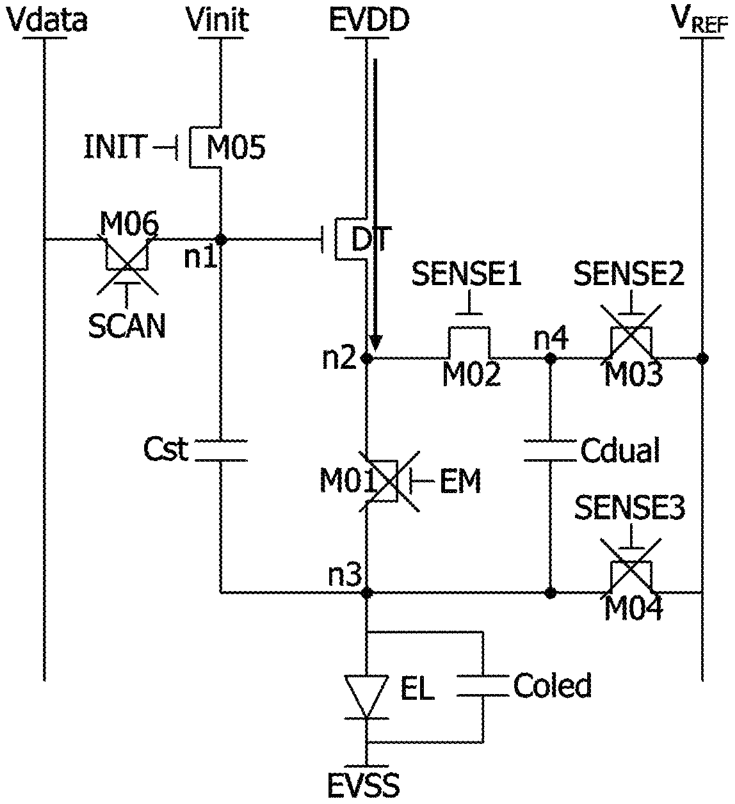
Figure 8B:
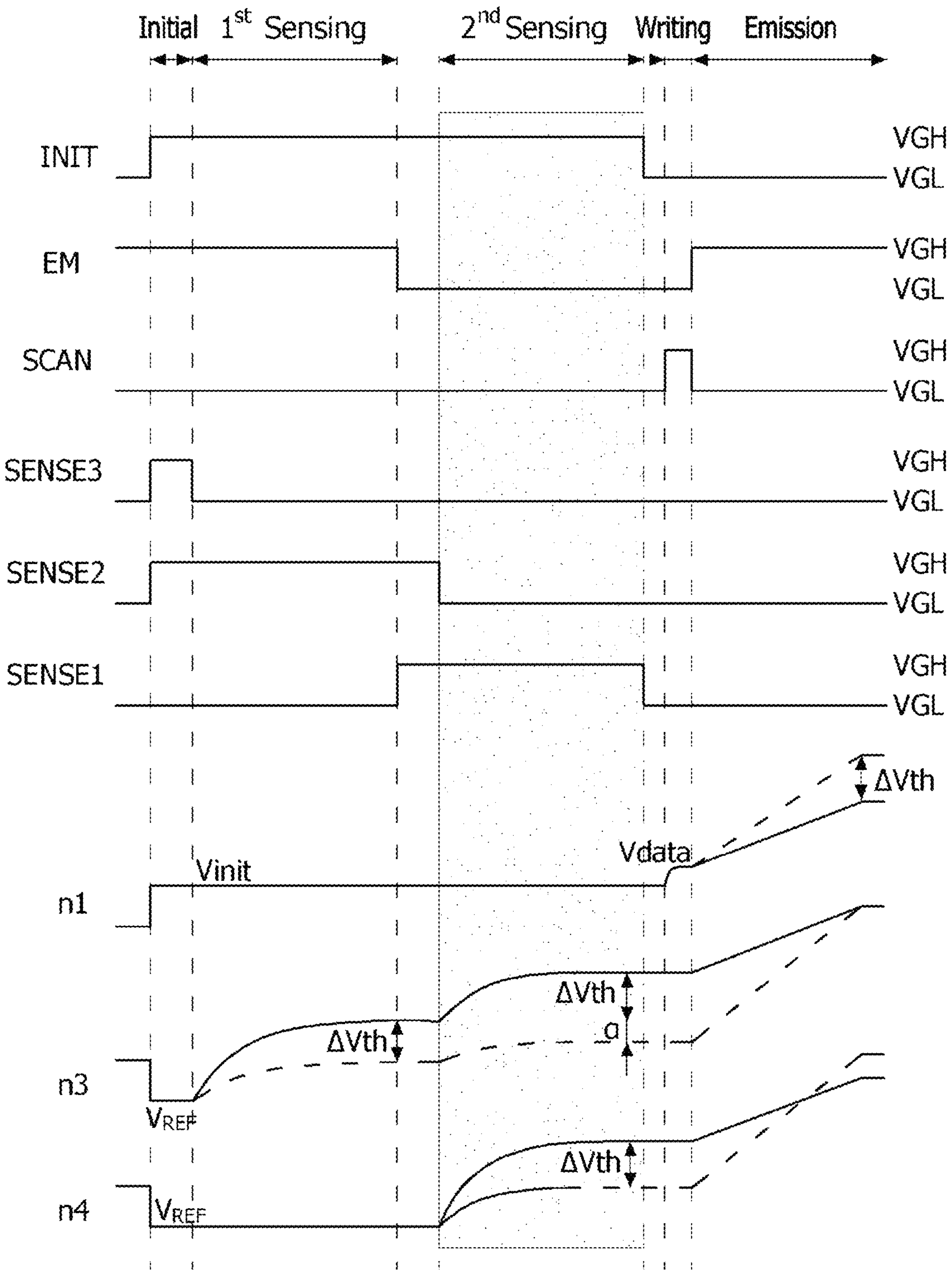

As shown in FIGS. 8A and 8B, in the second sensing period, the second switch element M02 and the fifth switch element M05 are turned on, and the first switch element M01, the third switch element M03, the fourth switch element M04, and the sixth switch element M06 are turned off.

In this case, although FIG. 8B illustrates that a period in which the third switch element M03 is turned on partially overlaps with a period in which the second switch element M02 is turned on, the disclosure is not necessarily limited thereto. If the period in which the third switch element M03 is turned on and the period in which the second switch element M02 is turned on partially overlap with each other, a fluctuation range of the compensation voltage α may be reduced.

The voltages of the second and fourth nodes n2 and n4 also have a deviation of ΔVth due to a current flowing through the driving element DT, and the compensation voltage α is transferred to the third node n3 through the second capacitor Cdual. Therefore, the source voltage Vs of the driving element DT may rise to Vg−(Vth+α), which is a difference between the gate voltage Vg and the threshold voltage Vth+α. At this time, the threshold voltage may be stored in the first capacitor Cst and be secondarily compensated.

Figure 9A:
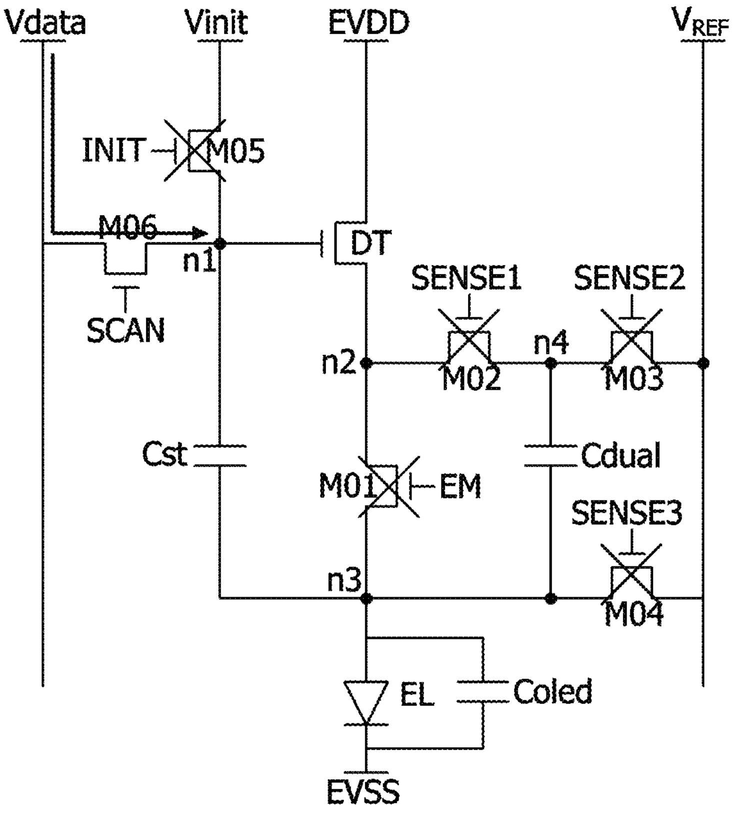
Figure 9B:
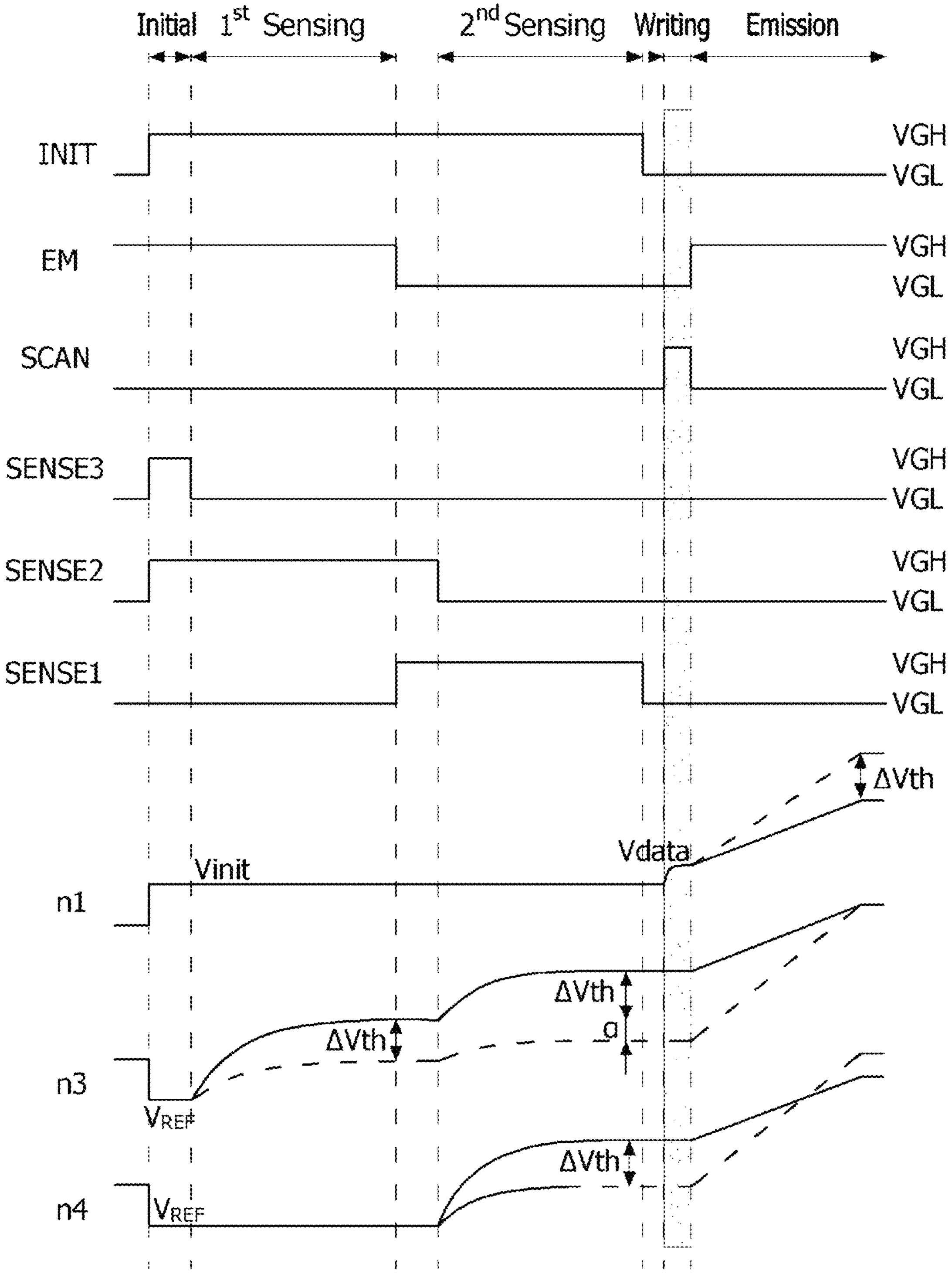

As shown in FIGS. 9A and 9B, in a writing period, the sixth switch element M06 is turned on, and the first switch element M01, the second switch element M02, the third switch element M03, the fourth switch element M04, and the fifth switch element M05 are turned off.

The data voltage Vdata is applied to the first node n1 through the sixth switch element M06, and thereby the voltage of the first node n1 increases. The voltage of the first node n1 rises to Vdata from Vinit.

Figure 10A:
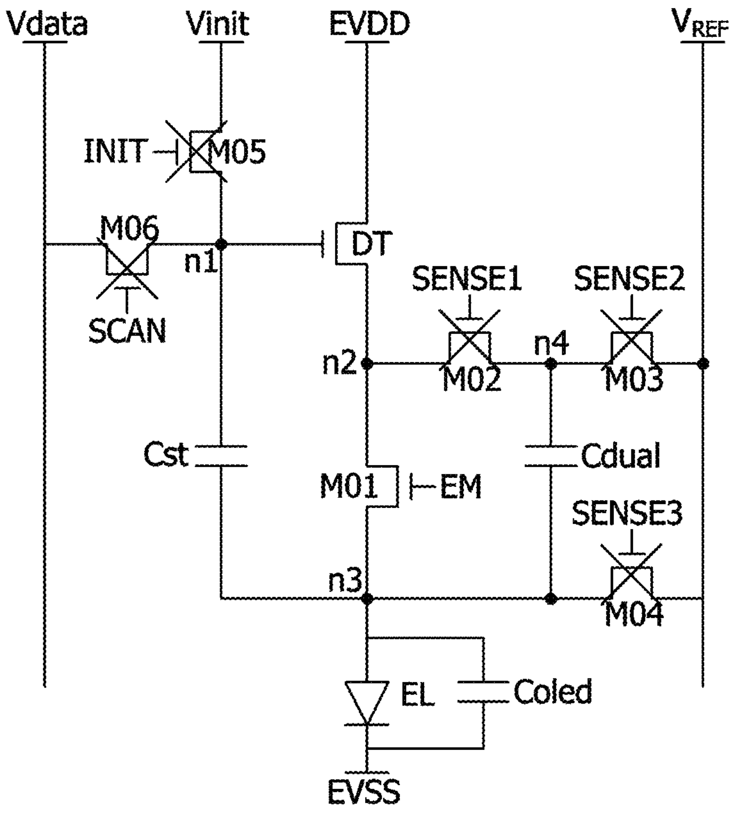
Figure 10B:
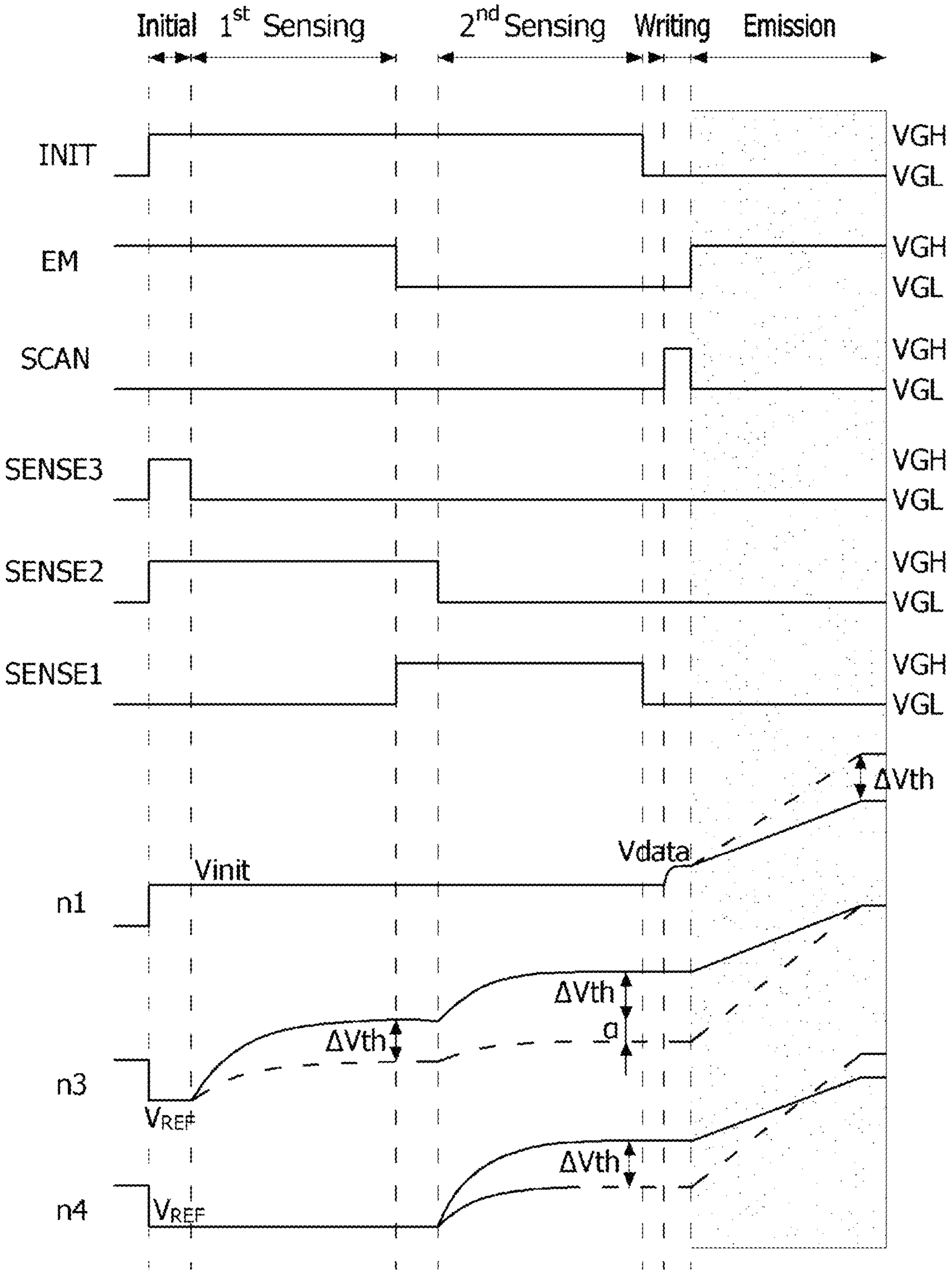

As shown in FIGS. 10A and 10B, in a boosting and emission period, the first switch element M01 is turned on, and the second switch element M02, the third switch element M03, the fourth switch element M04, the fifth switch element M05, and the sixth switch element M06 are turned off.

The voltage of the third node increases due to a current flowing through the driving element DT, and the gate node of the driving element DT (i.e., the first node n1) is in a floating state. Thus, a change in the voltage of the third node n3 is transferred to the first node n1 by the first capacitor Cst. At this time, 100% of the voltage change at the third node n3 should be transferred to the first node n1 by the first capacitor Cst. However, the voltage change is not transmitted up to 100% due to the effect of a parasitic capacitor formed at the gate node, thus causing a boosting loss. In the example embodiment, the threshold voltage including the compensation corresponding to the boosting loss may be stored in the first capacitor Cst, so that the boosting loss can be offset. That is, the voltage of the third node may become Vth+α−β.

The compensation voltage may vary depending on a ratio of a capacitance of the first capacitor Cst to a capacitance of the second capacitor Cdual. Values of the first and second capacitors may be preset. A principle of setting the values of the first and second capacitors will be described as follows.

An equation for compensating for the boosting loss of the threshold voltage Vth is Equation 1 below.

$$\mathrm{V}th + \alpha = \frac{1}{B_{Loss}} \times \mathrm{V}th \qquad \text{(Equation 1)}$$

Here, α is a compensation voltage, and $B_{LOSS}$ is a boosting loss rate.

In Equation 1, the compensation voltage α and the boosting loss rate $B_{LOSS}$ are as shown in Equations 2 and 3 below.

$$\alpha = \frac{C_{dual}}{C_{st} + C_{oled}C_{dual}} \times \mathrm{V}th \qquad \text{(Equation 2)}$$

$$B_{Loss} = \frac{C_{st}}{C_{st} + C_{para}} \qquad \text{(Equation 3)}$$

Here, Cst is a first capacitor, Cdual is a second capacitor, and Cpara is a parasitic capacitor.

Applying Equations 2 and 3 to Equation 1, Equation 1 may be arranged as Equation 4 below.

$$\mathrm{V}th + \frac{C_{dual}}{C_{st} + C_{oled} + C_{dual}}\ \mathrm{V}th = \frac{C_{st} + C_{para}}{C_{st}} \times \mathrm{V}th \qquad \text{(Equation 4)}$$

By dividing the left and right sides of Equation 4 by Vth and rearranging them, Equation 5 below may be obtained.

$$\frac{C_{dual}}{C_{st} + C_{oled} + C_{dual}} = \frac{C_{para}}{C_{st}} \qquad \text{(Equation 5)}$$

By rearranging Equation 5 to calculate the value of the second capacitor, that is, Cdual, Equation 6 below may be obtained.

$$C_{dual} = \frac{(C_{st} \times C_{para}) + (C_{oled} \times C_{para})}{(C_{st} - C_{para})} \qquad \text{(Equation 6)}$$

Accordingly, in the example embodiment, the value of the second capacitor Cdual may be set based on Equation 6 above. As shown in Equation 6, the value of the second capacitor Cdual may vary depending on the value of the first capacitor Cst. By using the values of the first and second capacitors, the compensation voltage can be obtained from Equation 2.

Figure 11:
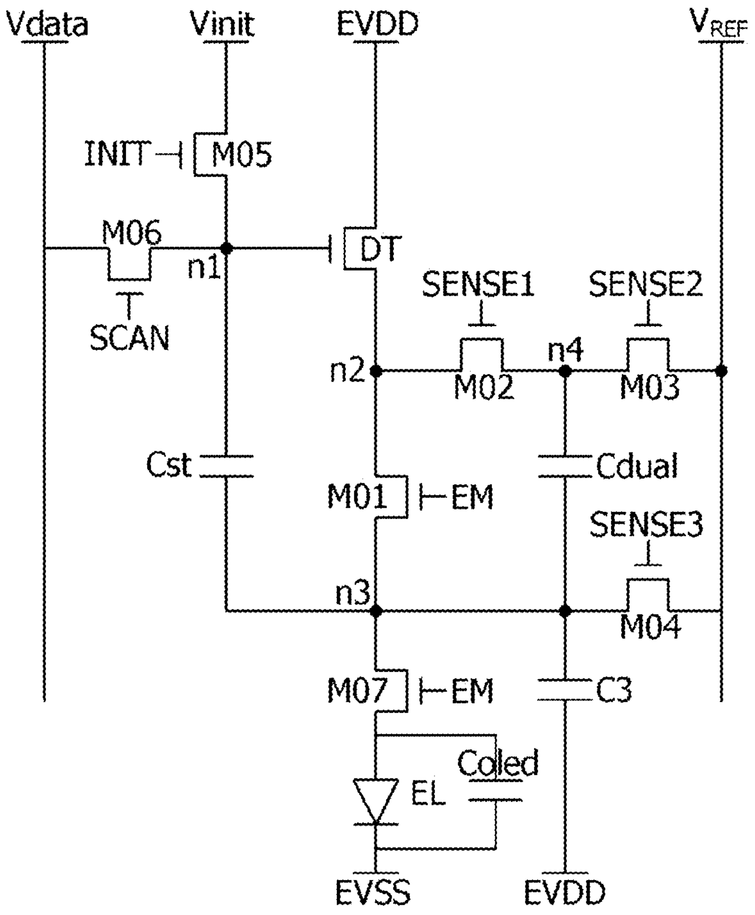
FIG. 11 is a diagram illustrating a pixel circuit according to a third example embodiment of the present disclosure.

FIG. 11 is a diagram illustrating a pixel circuit according to a third example embodiment of the present disclosure.

As illustrated in FIG. 11, the pixel circuit according to the third example embodiment of the present disclosure may include a light emitting element EL, a driving element DT for supplying a current to the light emitting element EL, a plurality of switch elements M01, M02, M03, M04, M05, M06, and M07 for switching current paths connected to the driving element DT, a first capacitor Cst for storing a gate-source voltage of the driving element DT, a second capacitor Cdual, and a third capacitor C3. The driving element DT and the switch elements M01, M02, M03, M04, M05, M06, and M07 may each be implemented as an N-channel oxide TFT, but the present disclosure is not limited thereto.

A seventh switch element M07 may be turned on according to a gate-on voltage of an EM signal EM and connect the second electrode of the driving element DT to the anode of the light emitting element EL. The seventh switch element M07 may include a gate connected to a first gate line to which the EM signal is applied, a first electrode connected to a third node n3, and a second electrode connected to the anode of the light emitting element EL.

The seventh switch element M07 may be turned off according to a gate-off voltage of the EM signal EM together with the first switch element M01, thereby reducing a deviation of Coled shown in Equation 2 above.

The third capacitor C3 may be connected between the third node n3 and a second high-potential voltage line to which a high-potential voltage EVDD is applied. The third capacitor C3 may suppress a voltage increase of the source node of the driving element DT (i.e., the second node n2) when the data voltage Vdata is applied.

Figure 12:
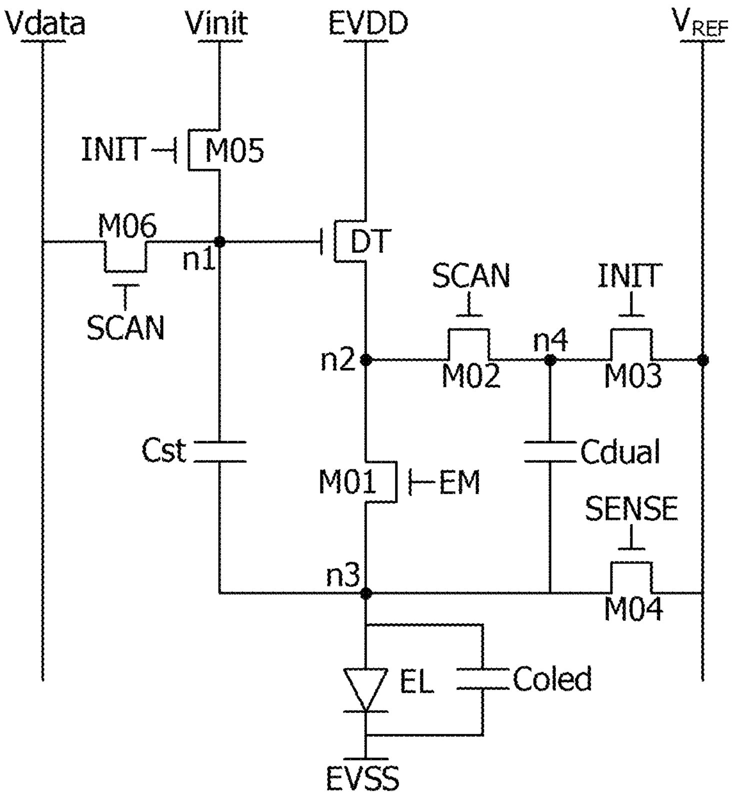
FIG. 12 is a diagram illustrating a pixel circuit according to a fourth example embodiment of the present disclosure.
Figure 13:
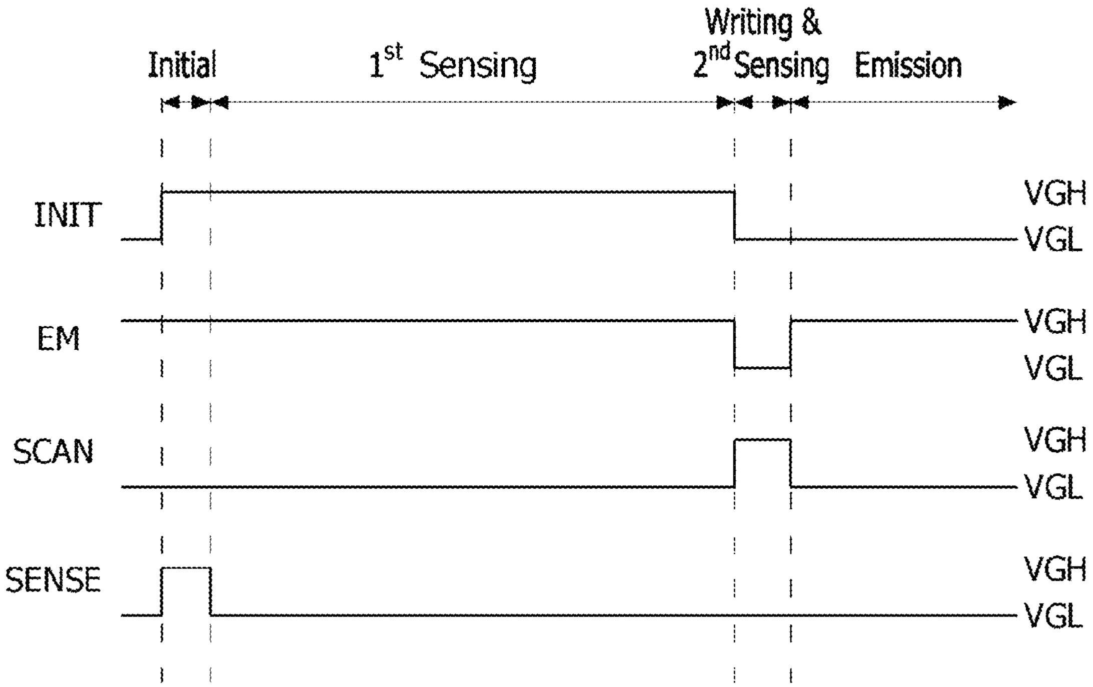
FIG. 13 is a diagram illustrating an example driving timing of the example pixel circuit shown in FIG. 12.

FIG. 12 is a diagram illustrating a pixel circuit according to a fourth example embodiment of the present disclosure, FIG. 13 is a diagram illustrating an example driving timing of the example pixel circuit shown in FIG. 12. FIGS. 14A to 17B are diagrams illustrating a driving principle of the example pixel circuit shown in FIG. 12.

As illustrated in FIG. 12, the pixel circuit according to the fourth example embodiment of the present disclosure may include a light emitting element EL, a driving element DT for supplying a current to the light emitting element EL, a plurality of switch elements M01, M02, M03, M04, M05, and M06 for switching current paths connected to the driving element DT, a first capacitor Cst for storing a gate-source voltage of the driving element DT, and a second capacitor Cdual. The driving element DT and the switch elements M01, M02, M03, M04, M05, and M06 may each be implemented as an N-channel oxide TFT, but the present disclosure is not limited thereto.

A first switch element M01 may be turned on according to a gate-on voltage of an EM signal EM and connect the second electrode of the driving element DT to the anode of the light emitting element EL. The first switch element M01 may include a gate connected to a first gate line to which the EM signal is applied, a first electrode connected to the second node n2, and a second electrode connected to a third node n3.

A second switch element M02 may be turned on according to a gate-on voltage of a scan signal SCAN and connect the second node n2 connected to the second electrode of the driving element DT to a fourth node n4. The second switch element M02 may include a gate connected to a second gate line to which the scan signal SCAN is applied, a first electrode connected to the second node n2, and a second electrode connected to the fourth node n4.

A third switch element M03 may be turned on according to a gate-on voltage of an initialization signal INIT and connect the fourth node n4 to a reference voltage line to apply a reference voltage $V_{REF}$. The third switch element M03 may include a gate connected to a third gate line to which the initialization signal INIT is applied, a first electrode connected to the fourth node n4, and a second electrode connected to the reference voltage line to which the reference voltage $V_{REF}$ is applied.

A fourth switch element M04 may be turned on according to a gate-on voltage of a sensing signal SENSE and connect the reference voltage line to the third node n3 to apply the reference voltage $V_{REF}$. The fourth switch element M04 may include a gate connected to a fourth gate line to which the sensing signal SENSE is applied, a first electrode connected to the third node n3, and a second electrode connected to the reference voltage line to which the reference voltage $V_{REF}$ is applied.

A fifth switch element M05 may apply an initialization voltage Vinit in response to an initialization signal INIT. In this case, the initialization voltage Vinit may be applied to the first node n1 through an initialization voltage line. The fifth switch element M05 may include a gate to which the initialization signal INIT is applied, a first electrode connected to the initialization voltage line to which the initialization voltage Vinit is applied, and a second electrode connected to the first node n1.

A sixth switch element M06 may be turned on according to a gate-on voltage of a scan signal SCAN and connect a data voltage line to the first node n1 to apply a data voltage Vdata. The sixth switch element M06 may include a gate connected to the second gate line to which the scan signal SCAN is applied, a first electrode connected to the data voltage line to which the data voltage Vdata is applied, and a second electrode connected to the first node n1.

As shown in FIG. 13, in the first sensing period, the first switch element M01, the third switch element M03, and the fifth switch element M05 are turned on, and the second switch element M02, the fourth switch element M04, and the sixth switch element M06 are turned off.

In the writing and second sensing period, the second switch element M02 and the fifth switch element M05 are turned on, and the first switch element M01, the third switch element M03, the fourth switch element M04, and the sixth switch element M06 are turned off.

Figure 14A:
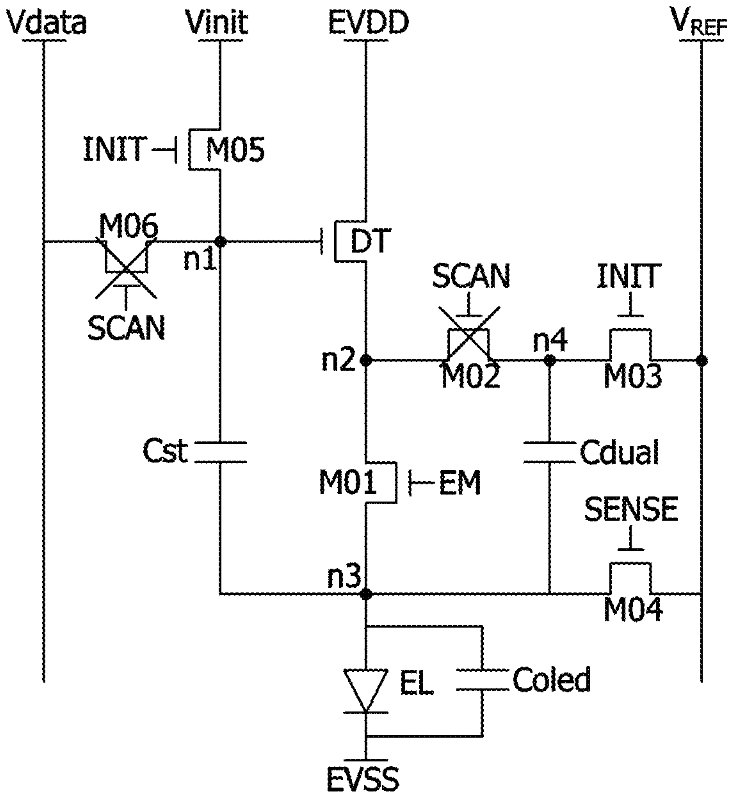
FIGS. 14A to 17B are diagrams illustrating a driving principle of the example pixel circuit shown in FIG. 12.
Figure 14B:
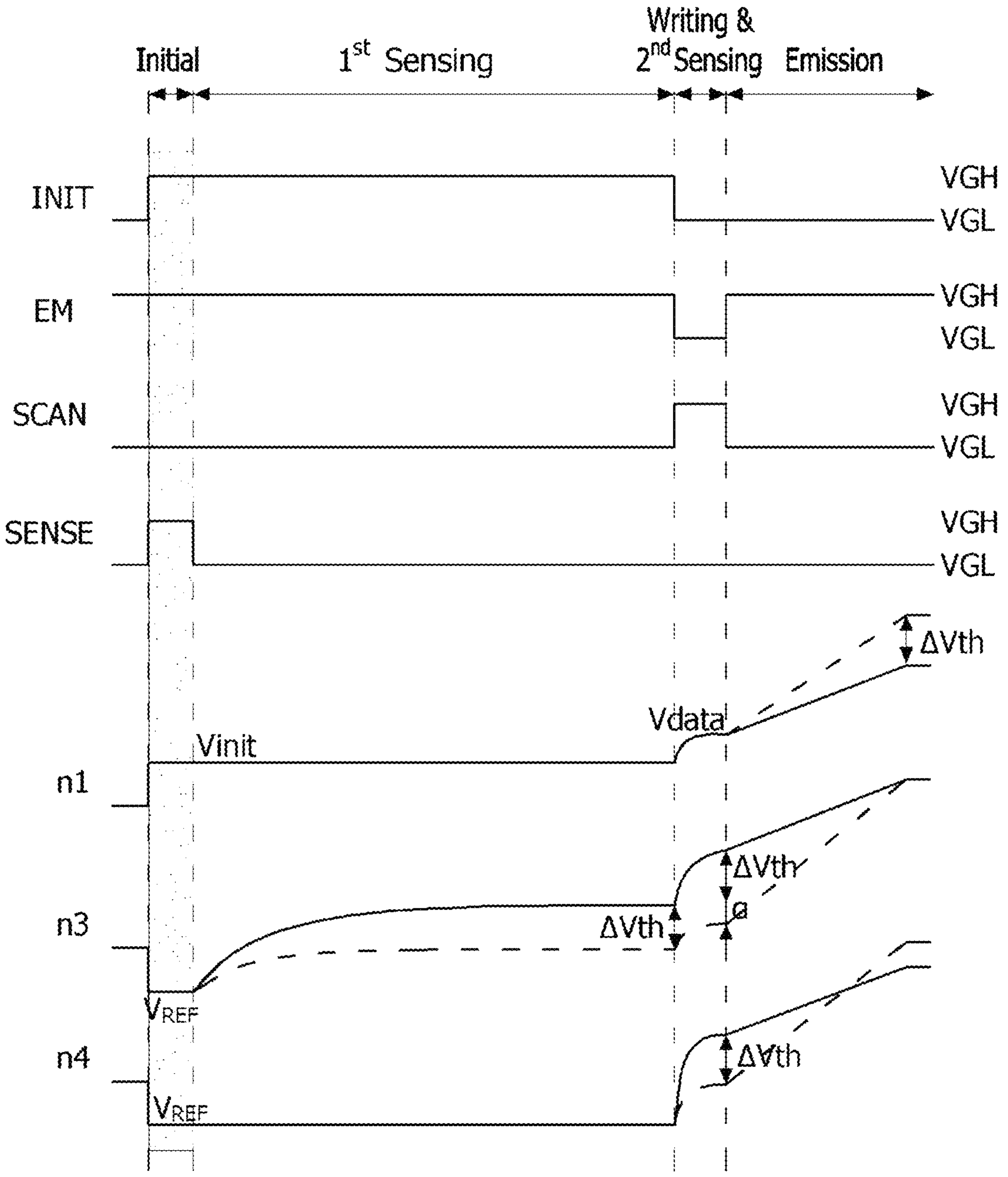

As shown in FIGS. 14A and 14B, in the initialization period, the first switch element M01, the third switch element M03, the fourth switch element M04, and the fifth switch element M05 are turned on, and the second switch element M02 and the sixth switch element M06 are turned off. The initialization voltage Vinit is applied to the first node n1 through the fifth switch element M05. The reference voltage $V_{REF}$ is applied to the third node n3 and the fourth node n4 through the fourth switch element M04 and the third switch element M03, respectively.

Figure 15A:
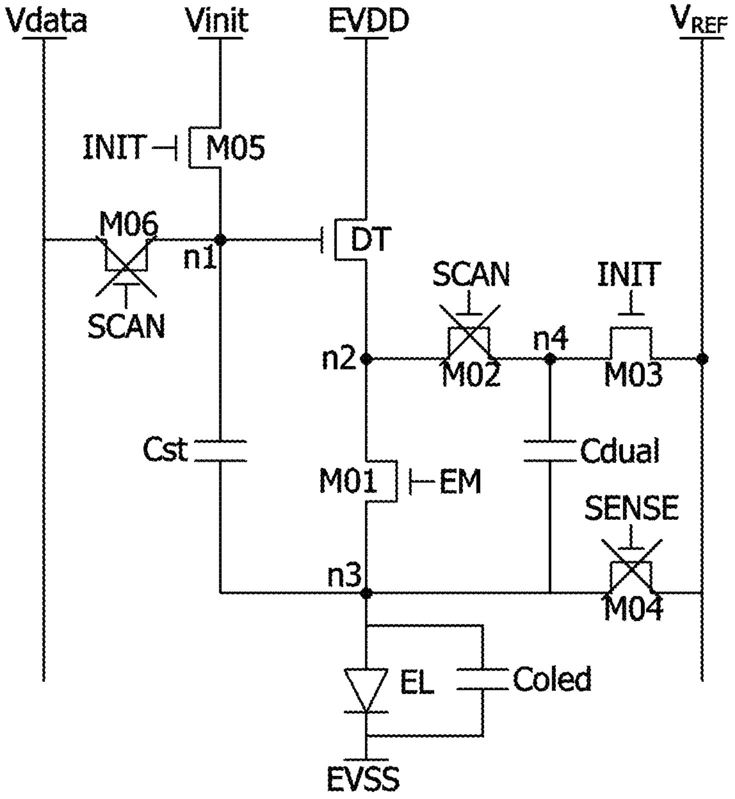
Figure 15B:
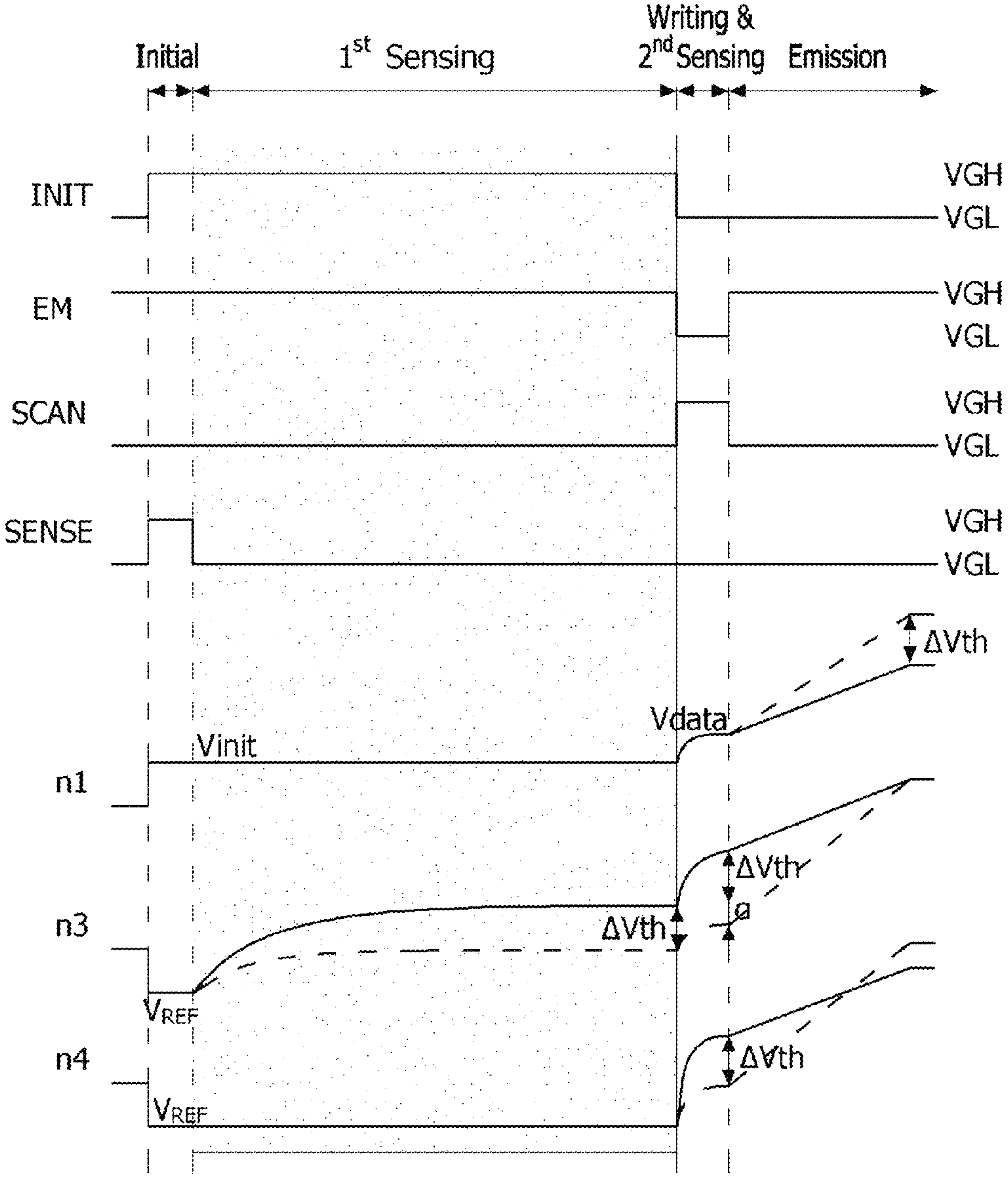

As shown in FIGS. 15A and 15B, in the first sensing period, the first switch element M01, the third switch element M03, and the fifth switch element M05 are turned on, and the second switch element M02, the fourth switch element M04, and the sixth switch element M06 are turned off.

The voltage of the third node n3 has a deviation of ΔVth due to a current flowing through the driving element DT, and the source voltage Vs of the driving element DT may rise to the difference Vg−Vth, which is a difference between the gate voltage Vg and the threshold voltage Vth. At this time, the threshold voltage may be stored in the first capacitor Cst and be primarily compensated.

Figure 16A:
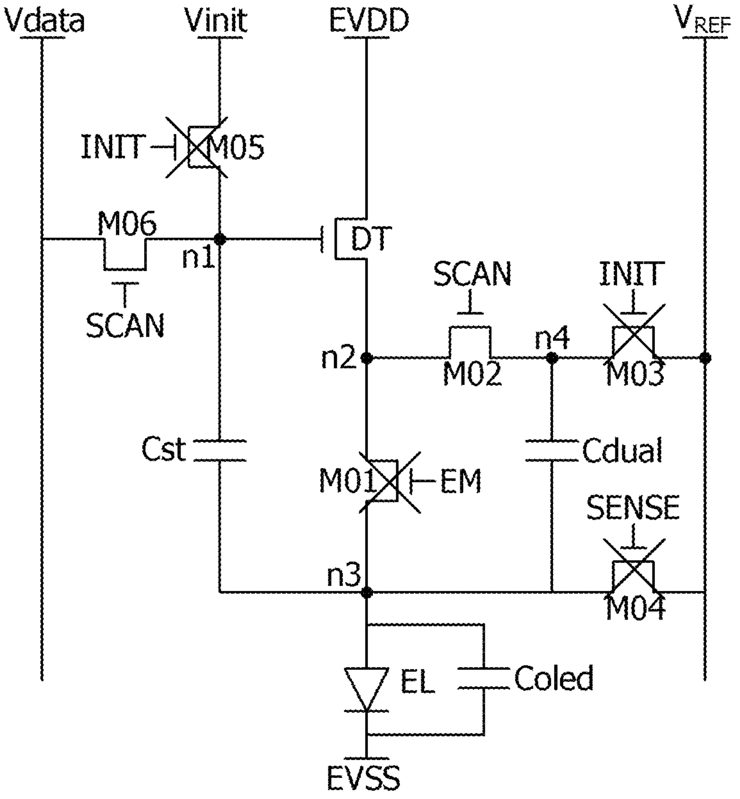
Figure 16B:
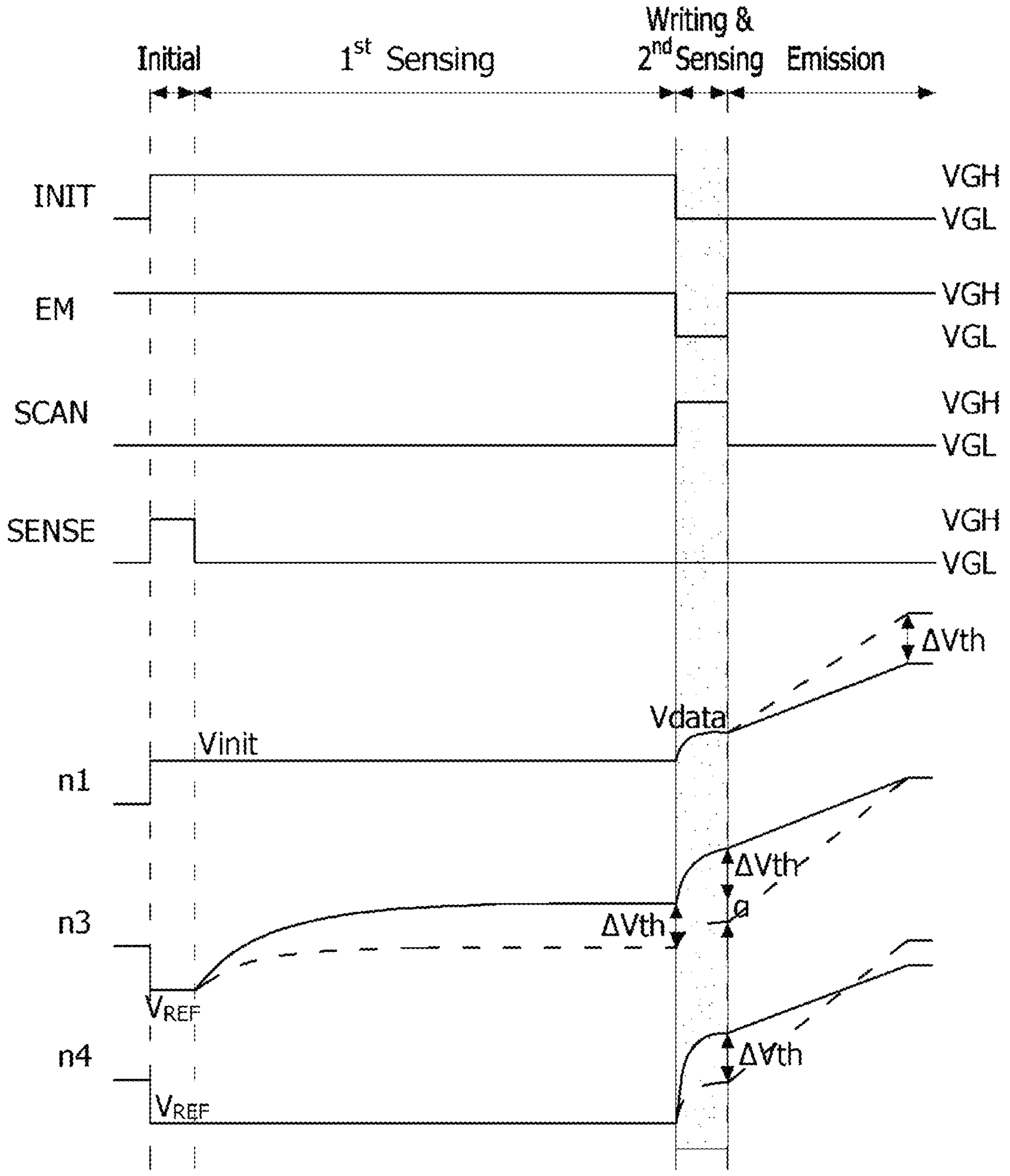

As shown in FIGS. 16A to 16B, in the writing and second sensing period, the second switch element M02 and the sixth switch element M06 are turned on, and the first switch element M01, the third switch element M03, the fourth switch element M04, and the fifth switch element M05 are turned off.

The data voltage Vdata is applied to the first node n1 through the sixth switch element M06, and thereby the voltage of the first node n1 increases. The voltage of the first node n1 rises to Vdata from Vinit.

The voltages of the second and fourth nodes n2 and n4 also have a deviation of ΔVth due to a current flowing through the driving element DT, and the compensation voltage α is transferred to the third node n3 through the second capacitor Cdual. Therefore, the source voltage Vs of the driving element DT may rise to Vg−(Vth+α), which is a difference between the gate voltage Vg and the threshold voltage Vth+α. At this time, the threshold voltage Vth+α may be stored in the first capacitor Cst and be secondarily compensated.

Figure 17A:
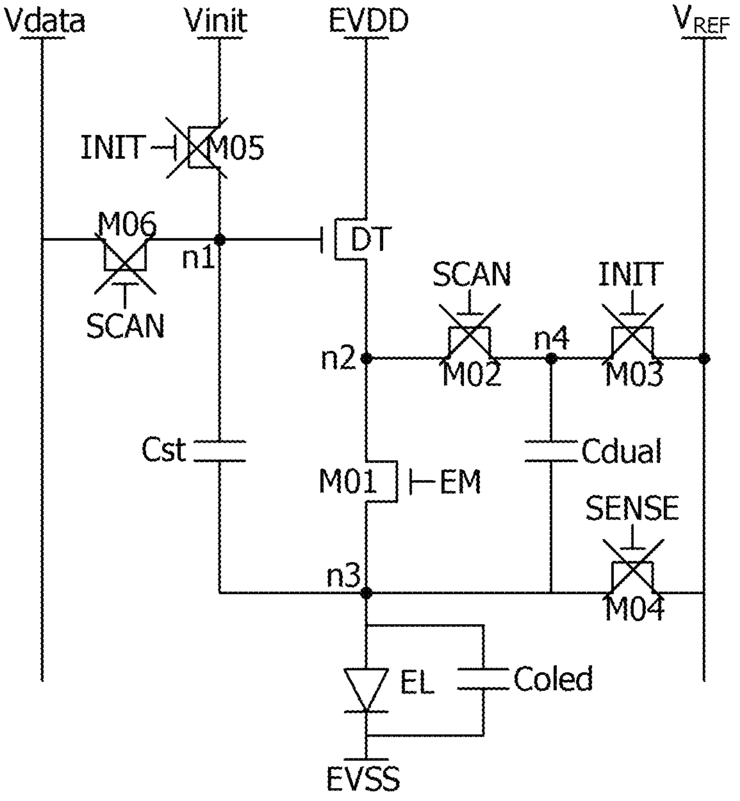
Figure 17B:
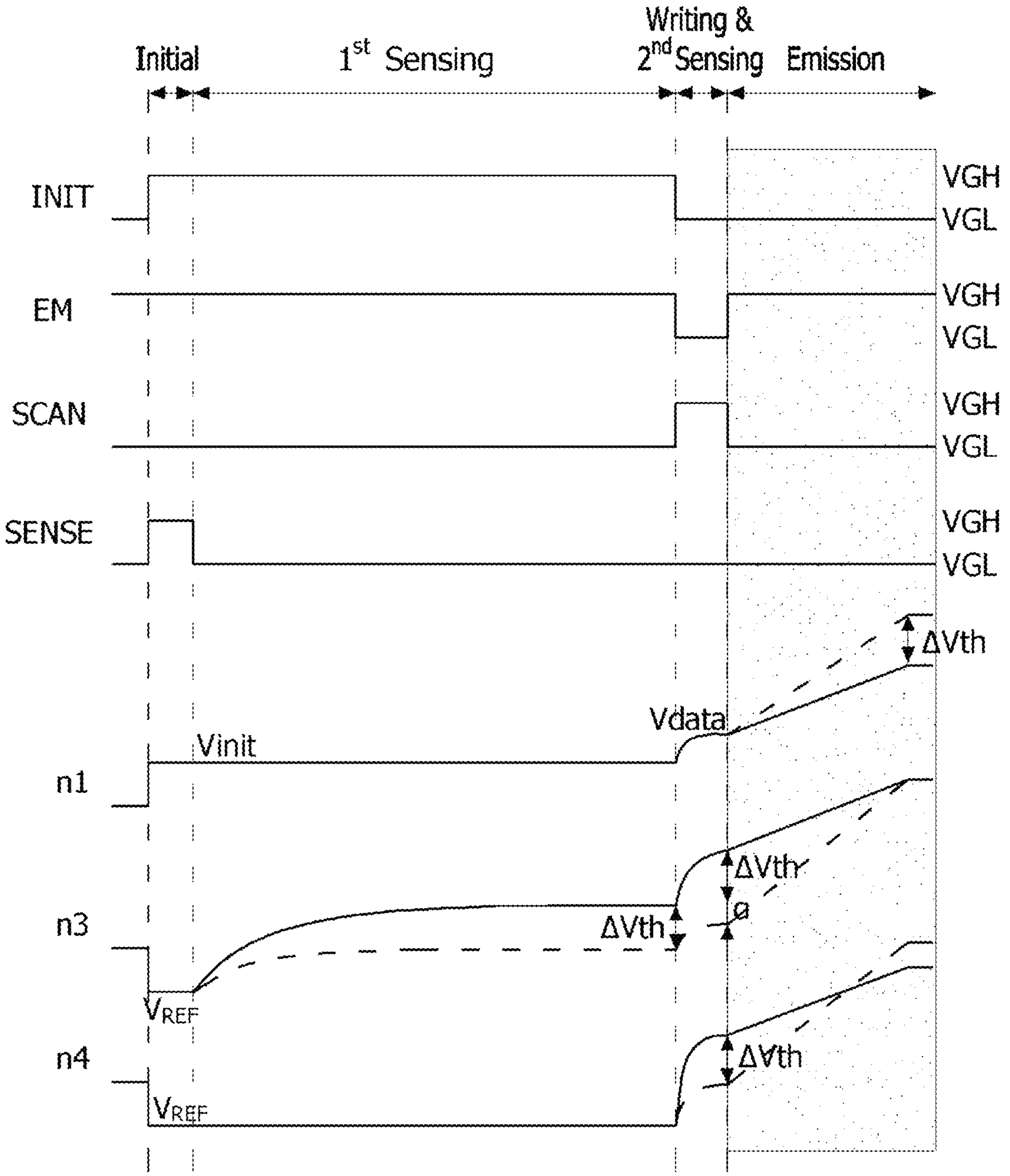

As shown in FIGS. 17A and 17B, in the boosting and emission period, the first switch element M01 is turned on, and the second switch element M02, the third switch element M03, the fourth switch element M04, the fifth switch element M05, and the sixth switch element M06 are turned off.

The voltage of the third node increases due to a current flowing through the driving element DT, and the gate node of the driving element DT (i.e., the first node n1) is in a floating state. Accordingly, a change in the voltage of the third node n3 is transferred to the first node n1 by the first capacitor Cst. At this time, 100% of the voltage change at the third node n3 should be transferred to the first node n1 by the first capacitor Cst. However, the voltage change is not transmitted up to 100% due to the effect of a parasitic capacitor formed at the gate node, thus causing a boosting loss. In the example embodiment, the threshold voltage including the compensation corresponding to the boosting loss may be stored in the first capacitor Cst, so that the boosting loss can be offset. That is, the voltage of the third node may become Vth+α−β.

Figure 18:
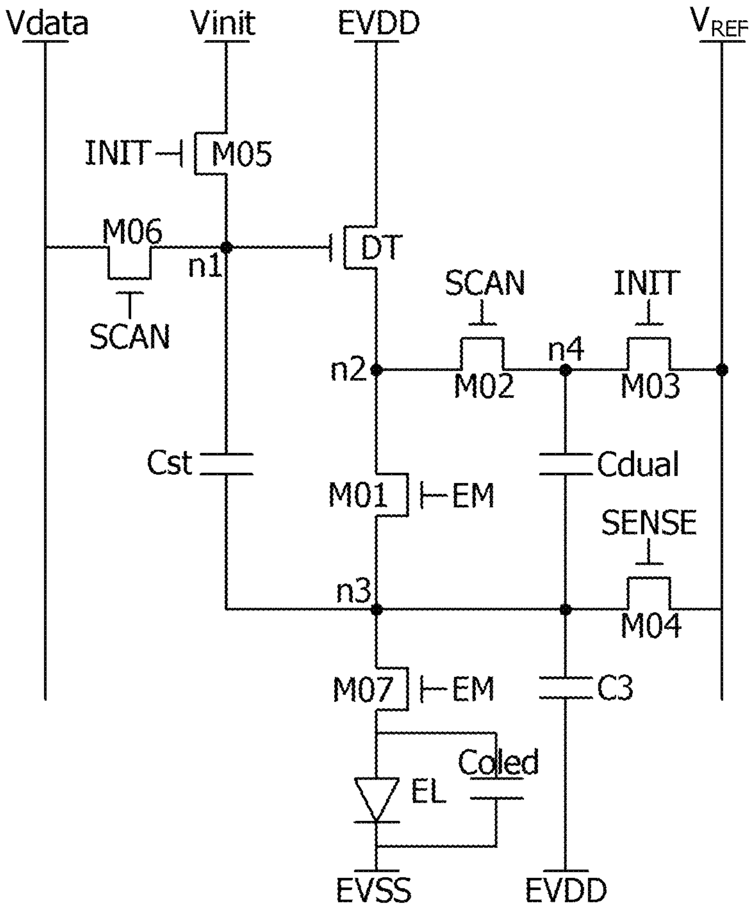
FIG. 18 is a diagram illustrating a pixel circuit according to a fifth example embodiment of the present disclosure.

FIG. 18 is a diagram illustrating a pixel circuit according to a fifth example embodiment of the present disclosure.

As illustrated in FIG. 18, the pixel circuit according to the fifth example embodiment of the present disclosure may include a light emitting element EL, a driving element DT for supplying a current to the light emitting element EL, a plurality of switch elements M01, M02, M03, M04, M05, M06, and M07 for switching current paths connected to the driving element DT, a first capacitor Cst for storing a gate-source voltage of the driving element DT, a second capacitor Cdual, and a third capacitor C3. The driving element DT and the switch elements M01, M02, M03, M04, M05, M06, and M07 may each be implemented as an N-channel oxide TFT, but the present disclosure is not limited thereto.

A seventh switch element M07 may be turned on according to a gate-on voltage of an EM signal EM and connect the second electrode of the driving element DT to the anode of the light emitting element EL. The seventh switch element M07 may include a gate connected to a first gate line to which the EM signal is applied, a first electrode connected to a third node n3, and a second electrode connected to the anode of the light emitting element EL.

The seventh switch element M07 may be turned off according to a gate-off voltage of the EM signal EM together with the first switch element M01, thereby reducing a deviation of Coled shown in Equation 2 above.

The third capacitor C3 may be connected between the third node n3 and a second high-potential voltage line to which a high-potential voltage EVDD is applied. The third capacitor C3 may suppress a voltage increase of the source node of the driving element DT (i.e., the second node n2) when the data voltage Vdata is applied.

Figure 19:
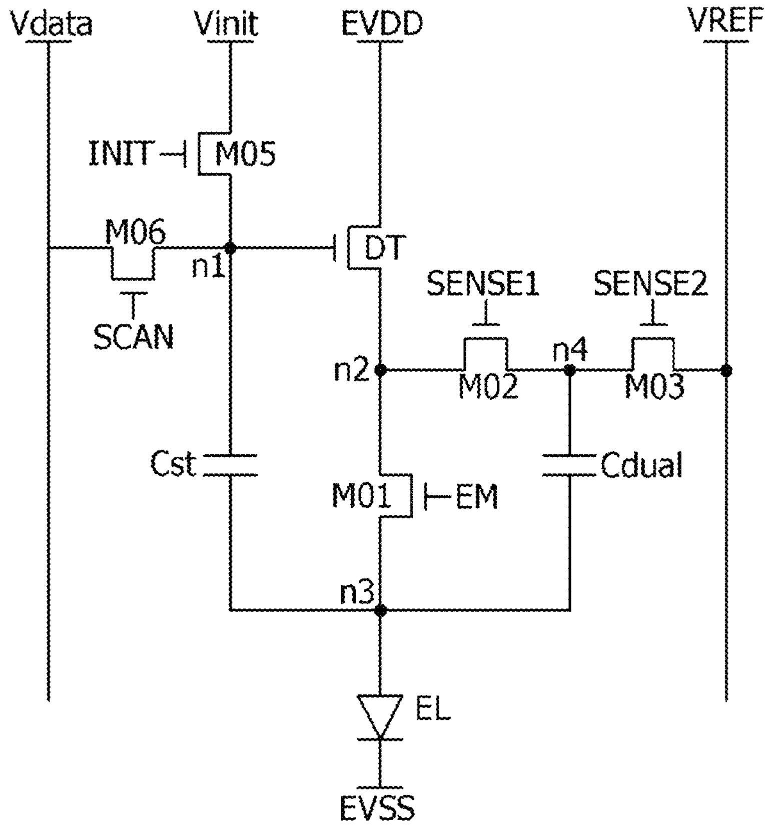
FIG. 19 is a diagram illustrating a pixel circuit according to a sixth example embodiment of the present disclosure.
Figure 20:
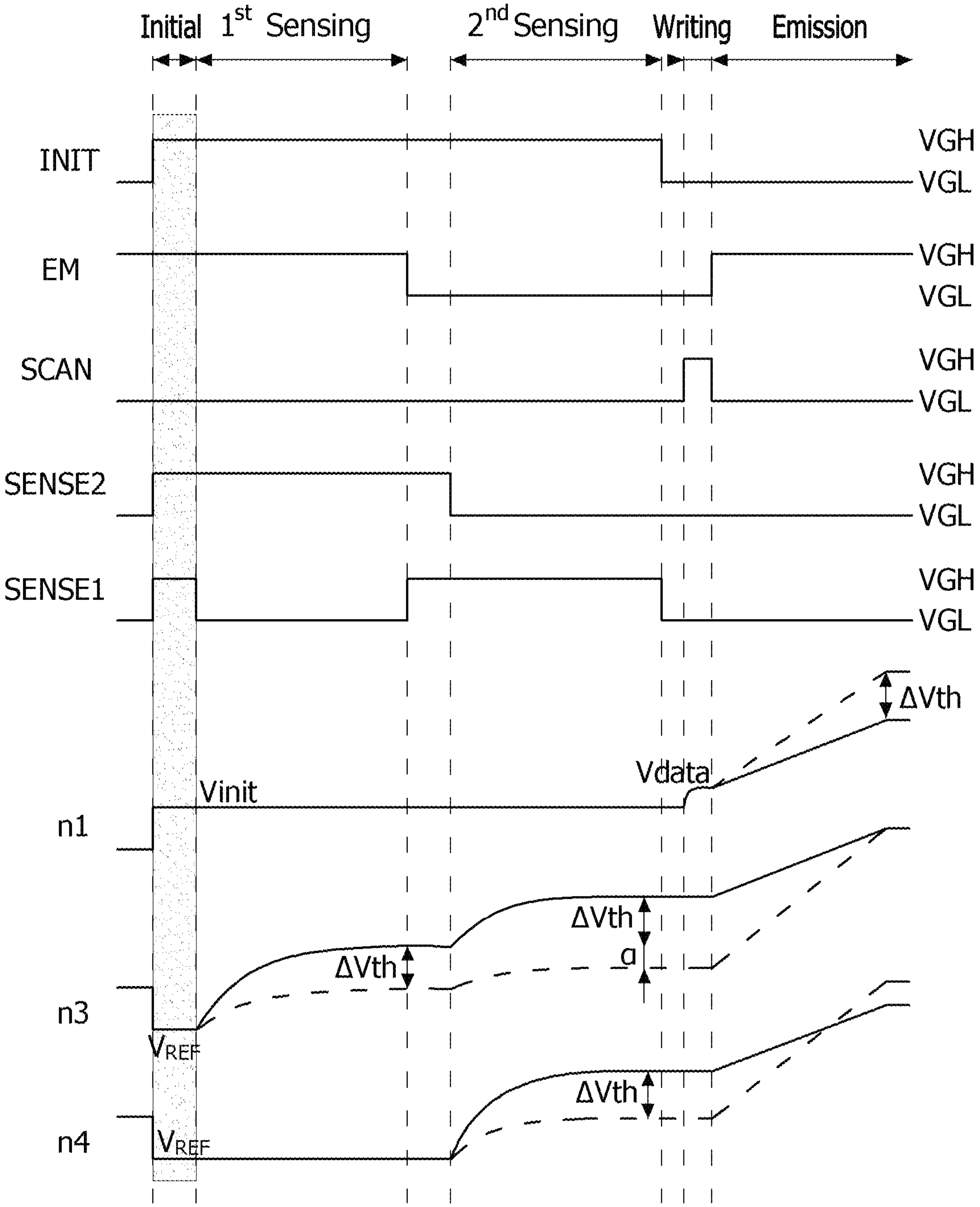
FIG. 20 is a diagram illustrating an example driving timing of the example pixel circuit shown in FIG. 19.

FIG. 19 is a diagram illustrating a pixel circuit according to a sixth example embodiment of the present disclosure. FIG. 20 is a diagram illustrating an example driving timing of the example pixel circuit shown in FIG. 19.

As illustrated in FIG. 19, the pixel circuit according to the sixth example embodiment of the present disclosure may include a light emitting element EL, a driving element DT for supplying a current to the light emitting element EL, a plurality of switch elements M01, M02, M03, M05, and M06 for switching current paths connected to the driving element DT, a first capacitor Cst for storing a gate-source voltage of the driving element DT, and a second capacitor Cdual. The driving element DT and the switch elements M01, M02, M03, M05, and M06 may each be implemented as an N-channel oxide TFT, but the present disclosure is not limited thereto.

A first switch element M01 may be turned on according to a gate-on voltage of an EM signal EM and connect the second electrode of the driving element DT to the anode of the light emitting element EL. The first switch element M01 may include a gate connected to a first gate line to which the EM signal is applied, a first electrode connected to the second node n2, and a second electrode connected to a third node n3.

A second switch element M02 may be turned on according to a gate-on voltage of a first sensing signal SENSE1 and connect the second node n2 connected to the second electrode of the driving element DT to a fourth node n4. The second switch element M02 may include a gate connected to a second gate line to which the first sensing signal SENSE1 is applied, a first electrode connected to the second node n2, and a second electrode connected to the fourth node n4.

A third switch element M03 may be turned on according to a gate-on voltage of a second sensing signal SENSE2 and connect the fourth node n4 to a reference voltage line to apply a reference voltage $V_{REF}$. The third switch element M03 may include a gate connected to a third gate line to which the second sensing signal SENSE2 is applied, a first electrode connected to the fourth node n4, and a second electrode connected to the reference voltage line to which the reference voltage $V_{REF}$ is applied.

A fifth switch element M05 may apply an initialization voltage Vinit in response to an initialization signal INIT. In this case, the initialization voltage Vinit may be applied to the first node n1 through an initialization voltage line. The fifth switch element M05 may include a gate to which the initialization signal INIT is applied, a first electrode connected to the initialization voltage line to which the initialization voltage Vinit is applied, and a second electrode connected to the first node n1.

A sixth switch element M06 may be turned on according to a gate-on voltage of a scan signal SCAN and connect a data voltage line to the first node n1 to apply a data voltage Vdata. The sixth switch element M06 may include a gate connected to the second gate line to which the scan signal SCAN is applied, a first electrode connected to the data voltage line to which the data voltage Vdata is applied, and a second electrode connected to the first node n1.

As shown in FIG. 20, in the first sensing period, the first switch element M01, the third switch element M03, and the fifth switch element M05 are turned on, and the second switch element M02, and the sixth switch element M06 are turned off.

In the second sensing period, the second switch element M02 and the fifth switch element M05 are turned on, and the first switch element M01, the third switch element M03, and the sixth switch element M06 are turned off.

The pixel circuit according to the sixth example embodiment may have a configuration similar to that of the pixel circuit according to the second example embodiment but with the fourth switch element M04 is removed from the pixel circuit. Thus, an additional design area can be secured by removing the switch fourth switch element M04.

It is to be noted that, although FIGS. 1 to 20 describe a number of example embodiments of the structures and timing operations of the pixel circuit, the present disclosure is not limited thereto. For example, the structures and timing operations of the pixel circuit may be modified in various different ways as long as the threshold voltage of the driving element DT can be sensed twice or more and/or the reduction due to boosting loss can be compensated for.

Figure 21A:
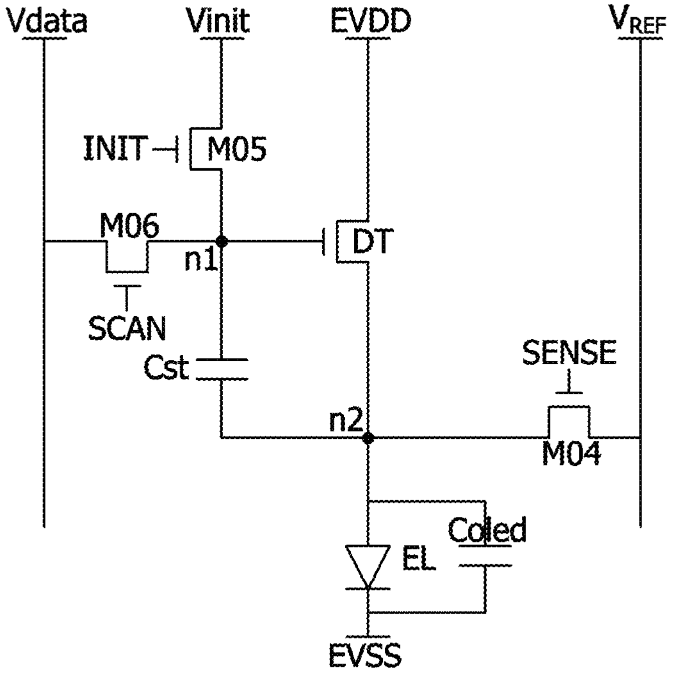
FIGS. 21A and 21B are diagrams illustrating simulation results of compensation performance of a pixel circuit according to an example embodiment.
Figure 21A:
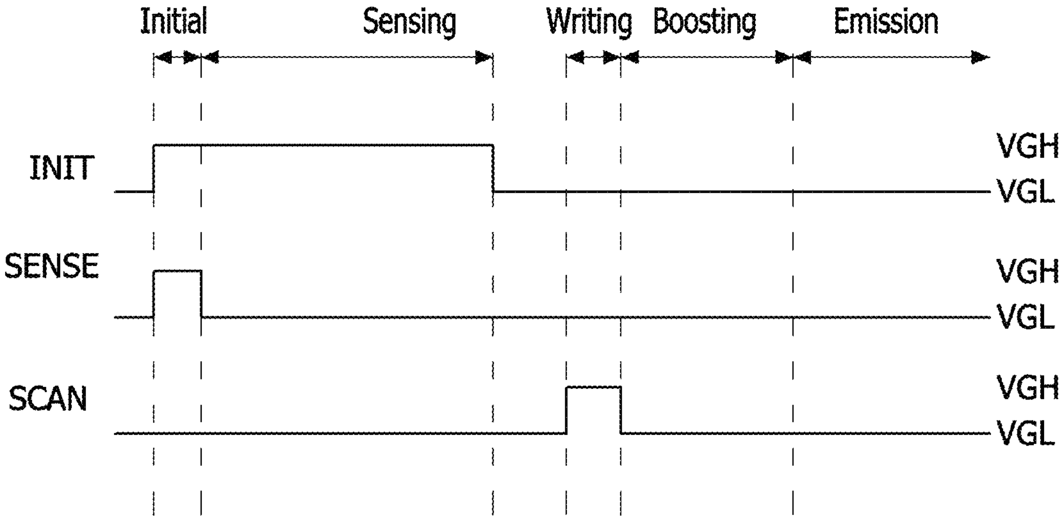
Figure 21B:
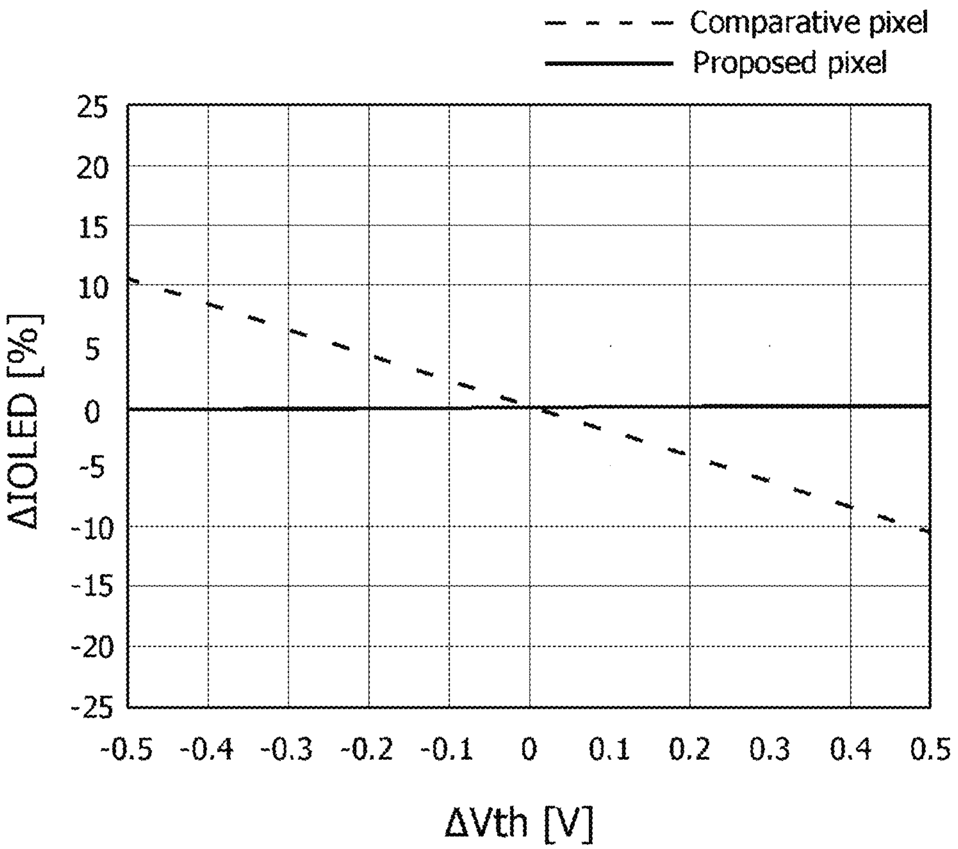

FIGS. 21A and 21B are diagrams illustrating simulation results of compensation performance of a pixel circuit according to an example embodiment. More specifically, FIG. 21A illustrates a diagram of a pixel circuit of a comparative example pixel and the driving timing thereof. FIG. 21B illustrates simulation results of a deviation of a current flowing through the light emitting element ΔIOLED with respect to a deviation of the threshold voltage ΔVth between a proposed pixel according to the example embodiment and the comparative example pixel.

As shown in FIGS. 21A and 21B, a result of simulating compensation performance between the proposed pixel according to the example embodiment and the comparative example pixel indicates that the compensation performance of the proposed pixel is more stable than that of the comparative example pixel of FIG. 21A. That is, because the proposed pixel sufficiently compensates for a difference in the threshold voltage, it can be seen that there is no change in the current flowing through the light emitting element even if there is a threshold voltage difference.

For example, simulation conditions using the example pixel circuit of FIG. 4 are as follows: EVDD of 20 V, EVSS of 0 V, VGH of 18 V, VGL of −6 V, Cst of 200 fF, Cdual of 10 fF, Vdata of 4.8 V, Vinit of 4.5 V, and $V_{REF}$ of 0.5 V.

Accordingly, using the pixel circuit according to the example embodiment, the threshold voltage deviation of the driving element DT between pixels may be compensated for through sensing the threshold voltage twice or more, and thus the image quality may be improved.

Figure 22:
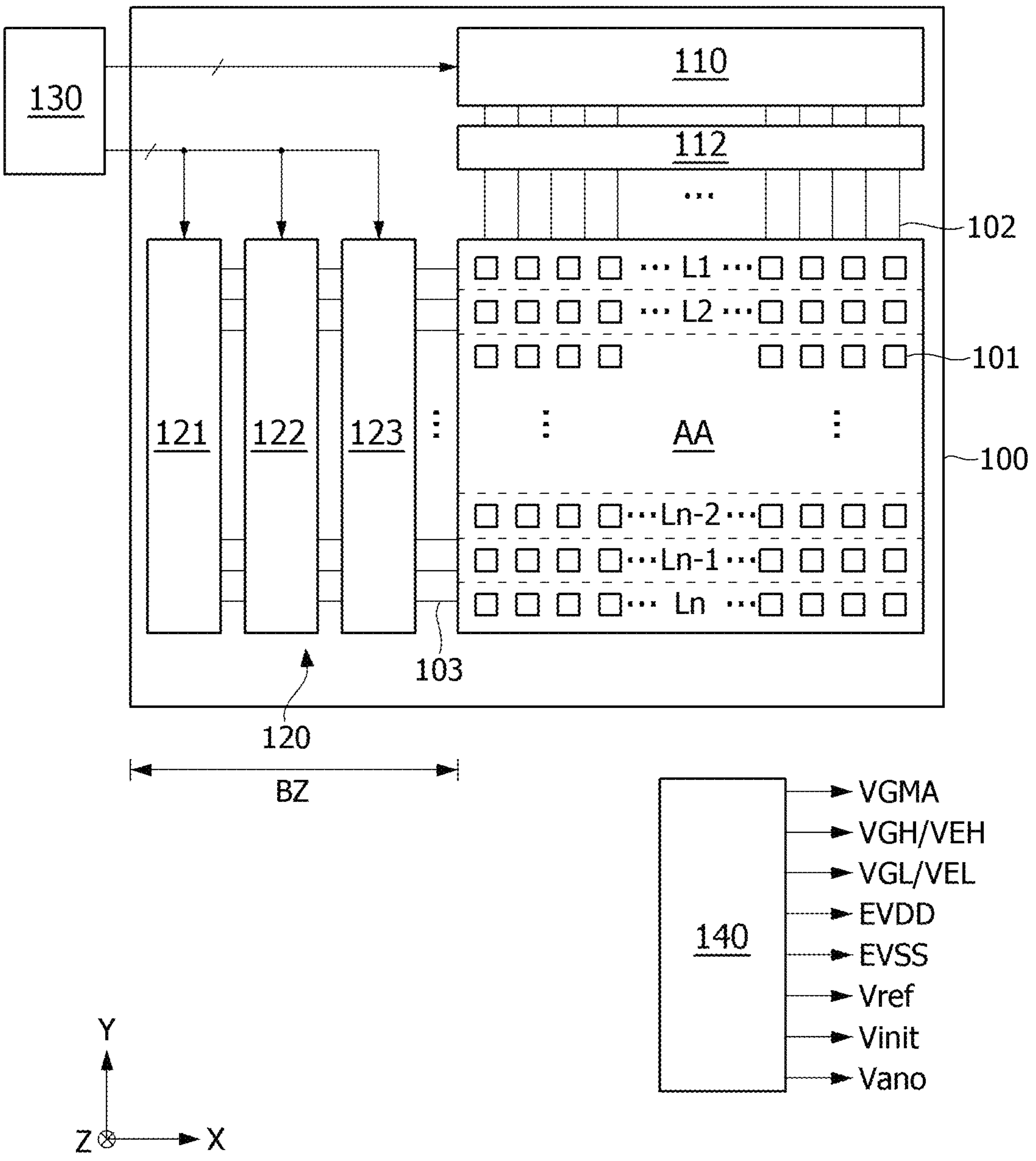
FIG. 22 is a block diagram illustrating a display device according to an example embodiment of the present disclosure.
Figure 23:
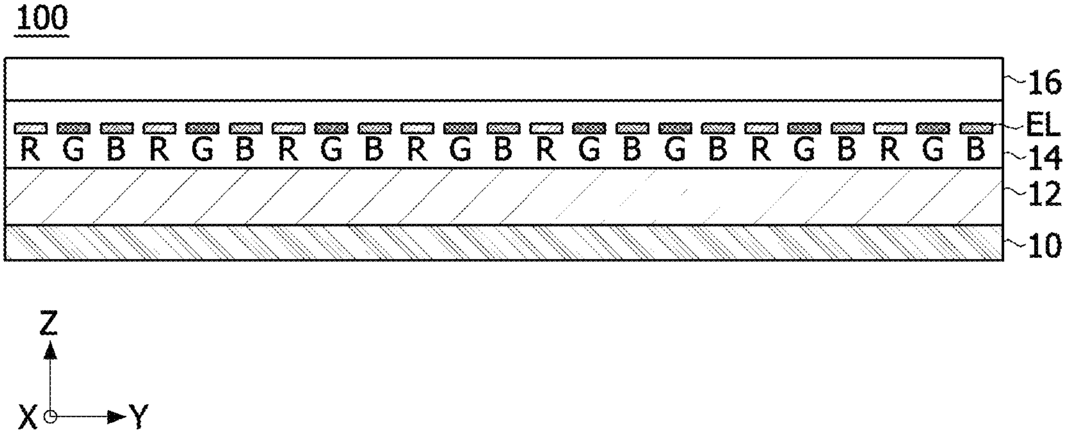
FIG. 23 is a diagram illustrating a cross-sectional structure of the example display panel shown in FIG. 22.

FIG. 22 is a block diagram illustrating a display device according to an example embodiment of the present disclosure. FIG. 23 is a diagram illustrating a cross-sectional structure of the display panel shown in FIG. 22.

As illustrated in FIG. 22, the display device according to an example embodiment of the present disclosure may include a display panel 100, a display panel driving circuit (e.g., 110 and 120) for writing pixel data to pixels of the display panel 100, and a power supply 140 for generating power necessary for driving the pixels and the display panel driving circuit.

The display panel 100 may include a pixel array AA that is configured to display an input image. The pixel array AA may include a plurality of data lines 102, a plurality of gate lines 103 intersecting with the data lines 102, and pixels 101 arranged in a matrix form.

The pixel array AA may include a plurality of pixel lines L1 to Ln. Each of the pixel lines L1 to Ln may include one line of pixels arranged along a line direction X in the pixel array AA of the display panel 100. Pixels arranged in one pixel line may share a corresponding one of the gate lines 103. Sub-pixels arranged in a column direction Y along a data line direction may share the same data line 102. One horizontal period 1H may be a time period obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel 100 or be implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film may be formed on the back plate. The pixel array AA and a touch sensor array may be formed on the organic thin film. The back plate may block moisture permeation so that the pixel array AA is not exposed to humidity. The organic thin film may be a thin Polyimide (PI) film substrate. A multi-layered buffer film may be formed of an insulating material (not shown) on the organic thin film. A number of lines may be formed on the organic thin film to supply power or other signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 may include a pixel circuit connected to the corresponding data line 102 and the corresponding gate line 103.

Each of the pixels may be implemented with any of the example pixel circuits shown in FIGS. 1, 4, 11, 12, 18, and 19. By compensating for the threshold voltage of the driving element through sensing twice or more, it is possible to compensate for the decrease in the threshold voltage due to the boosting loss.

Hereinafter, a pixel may be interpreted as having the same meaning as a sub-pixel.

As shown in FIG. 23, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, a de-multiplexer array 112, a circuit (not shown) for auto probe inspection, and the like. The wirings and circuit elements of the circuit layer 12 may include a plurality of insulating layers, two or more metal or conductive layers separated from one another with the insulating layer therebetween, and an active layer including a semiconductor material. All transistors formed in the circuit layer 12 may be implemented as oxide TFTs having an n-channel type oxide semiconductor, but the present disclosure is not limited thereto.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 may cover the light emitting element layer 14 to seal the circuit layer 12 and the light emitting element layer 14. The encapsulation layer 16 may have a multilayered insulating structure in which an organic film and an inorganic film are alternately stacked. The inorganic film may block penetration of moisture and oxygen. The organic film may planarize the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer (not shown) may be disposed on the encapsulation layer 16. The touch sensor layer may include capacitive type touch sensors that sense a touch input based on a change in capacitance before and after the touch input. The touch sensor layer may include metal or conductive wiring patterns and insulating layers forming the capacitance of the touch sensors. The capacitance of the touch sensor may be formed between the metal or conductive wiring patterns. A polarizing plate (not shown) may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or may be implemented as a circular polarizing plate. A cover glass may be adhered to the polarizing plate.

The display panel 100 may further include a touch sensor layer and a color filter layer (not shown) stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this example embodiment, by applying the color filter layer having a higher light transmittance than the polarizing plate to the display panel, the light transmittance of the display panel 100 can be improved, and the thickness and flexibility of the display panel 100 can be improved. A cover glass (not shown) may be adhered on the color filter layer.

The power supply 140 may generate DC power required for driving the pixel array AA and the display panel driving circuit of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages, such as a gamma reference voltage VGMA, gate-on voltages VGH and VEH, gate-off voltages VGL and VEL, a pixel driving voltage EVDD, and a pixel low-potential power supply voltage EVSS. The gamma reference voltage VGMA may be supplied to a data driver 110. The gate-on voltages VGH and VEH and the gate-off voltages VGL and VEL may be supplied to a gate driver 120. The pixel driving voltage EVDD and the pixel low-potential power supply voltage EVSS may be commonly supplied to the pixels.

The display panel driving circuit may write pixel data (digital data) of an input image to the pixels of the display panel 100 under the control of a timing controller (TCON) 130.

The display panel driving circuit may include the data driver 110 and the gate driver 120.

A de-multiplexer (DEMUX) 112 may be disposed between the data driver 110 and the data lines 102. The de-multiplexer 112 may sequentially connect one channel of the data driver 110 to the plurality of data lines 102 and distribute in a time division manner the data voltage outputted from one channel of the data driver 110 to the data lines 102, thereby reducing the number of channels of the data driver 110. The de-multiplexer array 112 may be omitted. In this case, output buffers of the data driver 110 may be directly connected to the data lines 102.

The display panel driving circuit may further include a touch sensor driver for driving the touch sensors. The touch sensor driver is not illustrated in FIG. 22. In a mobile device, the timing controller 130, the power supply 140, the data driver 110, and the like may be integrated into one drive integrated circuit (IC).

The data driver 110 may generate a data voltage Vdata by converting pixel data of an input image received from the timing controller 130 with a gamma compensation voltage every frame period by using a digital to analog converter (DAC). The gamma reference voltage VGMA may be divided for respective gray scales through a voltage divider circuit. The gamma compensation voltage divided from the gamma reference voltage VGMA may be provided to the DAC of the data driver 110. The data voltage Vdata may be outputted through the output buffer in each of the channels of the data driver 110.

In the data driver 110, the output buffer included in one channel may be connected to adjacent data lines 102 through the de-multiplexer array 112. The de-multiplexer array 112 may be formed directly on the substrate of the display panel 100 or be integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 may sequentially output gate signals to the gate lines 103 under the control of the timing controller 130. The gate driver 120 may sequentially supply the gate signals to the gate lines 103 by shifting the gate signals using a shift register.

The gate signal may include a scan signal for selecting pixels of a line in which data is to be written in synchronization with the data voltage, and an EM signal defining an emission time of pixels charged with the data voltage.

The gate driver 120 may include a scan driver 121, an EM driver 122, and an initialization driver 123.

The scan driver 121 may output a scan signal SCAN in response to a start pulse and a shift clock from the timing controller 130 and may shift the scan signal SCAN according to the shift clock timing. The EM driver 122 may output an EM signal EM in response to a start pulse and a shift clock from the timing controller 130 and may sequentially shift the EM signal EM according to the shift clock. The initialization driver 123 may output an initialization signal INIT in response to a start pulse and a shift clock from the timing controller 130 and may shift the initialization signal INIT according to the shift clock timing. Therefore, the scan signal SCAN, the EM signal EM, and the initialization signal INIT may be sequentially supplied to the gate lines 103 of the pixel lines L1 to Ln, respectively. In case of a bezel-free model, at least some of the transistors constituting the gate driver 120 and clock wirings may be dispersedly disposed in the pixel array AA.

The timing controller 130 may receive, from a host system (not shown), digital video data of an input image and a timing signal synchronized therewith. The timing signal may include a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE may have a cycle of one horizontal period (1H).

The host system may be any one of a television (TV) system, a set-top box, a navigation system, a personal computer (PC), a home theater system, a vehicle system, and a mobile device system, but the present disclosure is not limited thereto.

The timing controller 130 may multiply an input frame frequency by i and control the operation timing of the display panel driving circuit with a frame frequency of the input frame frequency×i Hz, where i is a positive integer greater than 0. For example, the input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 may generate a data timing control signal for controlling the operation timing of the data driver 110, MUX signals MUX1 and MUX2 for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter may convert a low-level voltage of the gate timing control signal into the gate-off voltages VGL and VEL and converts a high-level voltage of the gate timing control signal into the gate-on voltages VGH and VEH. The gate timing signal may include the start pulse and the shift clock.

Although the example embodiments of the present disclosure have been described in more detail with reference to the accompanying drawings, the present disclosure is not limited thereto and may be embodied in many different forms without departing from the technical concept of the present disclosure. Therefore, the example embodiments disclosed in the present disclosure are provided for illustrative purposes only and are not intended to limit the technical concept of the present disclosure. Therefore, it should be understood that the above-described example embodiments are illustrative in all aspects and do not limit the present disclosure.

It will be apparent to those skilled in the art that various modifications and variations can be made in the present disclosure without departing from the spirit or scope of the disclosures. Thus, it is intended that the present disclosure covers such modifications and variations of this disclosure, provided that they come within the scope of the appended claims and their equivalents.

What is claimed is:

1. A pixel circuit, comprising:

a driving element including a gate connected directly to a first node to which a data voltage is configured to be applied, a first electrode connected to a high-potential voltage line, and a second electrode connected to a second node;

a first switch element connected between the second node and a third node;

a second switch element connected between the second node and a fourth node;

a third switch element connected between the fourth node and a reference voltage line;

a first capacitor connected between the first node and the third node, the first capacitor including an electrode connected directly to the first node and another electrode connected directly to the third node; and a second capacitor connected between the third node and the fourth node, the second capacitor including an electrode connected directly to the third node and another electrode connected directly to the fourth node, wherein the second switch element includes a gate configured to receive a first signal, and the third switch element includes a gate configured to receive a second signal different from the first signal.

2. The pixel circuit of claim 1, further comprising a light emitting element connected between the third node and a low-potential voltage line.

3. The pixel circuit of claim 1, wherein in a first sensing period, the driving element, the first switch element, and the third switch element are configured to be turned on, and the second switch element is configured to be turned off.

4. The pixel circuit of claim 3, wherein in a second sensing period following the first sensing period, the first switch element and the third switch element are configured to be turned off, and the driving element and the second switch element are configured to be turned on.

5. The pixel circuit of claim 4, wherein in the first sensing period, a threshold voltage of the driving element is configured to be stored in the first capacitor and is primarily compensated, and wherein in the second sensing period, the threshold voltage of the driving element is secondarily compensated by a compensation voltage.

6. The pixel circuit of claim 5, wherein the compensation voltage varies based on a ratio of a capacitance of the first capacitor to a capacitance of the second capacitor.

7. The pixel circuit of claim 6, wherein the capacitance of the second capacitor is set based on the capacitance of the first capacitor and a parasitic capacitor at the first node to compensate for a reduction in the threshold voltage due to a boosting loss.

8. The pixel circuit of claim 1, further comprising:

a fifth switch element connected between the first node and an initialization voltage line configured to receive an initialization voltage; and a sixth switch element connected between the first node and a data voltage line configured to receive the data voltage.

9. The pixel circuit of claim 8, further comprising:

a fourth switch element connected between the third node and the reference voltage line, wherein the first node is connected to the gate of the driving element, the fifth switch element, the sixth switch element, and the first capacitor, wherein the second node is connected to the second electrode of the driving element, the first switch element, and the second switch element, wherein the third node is connected to the first switch element, the fourth switch element, the first capacitor, the second capacitor, and a light emitting element connected to a low-potential voltage line, and wherein the fourth node is connected to the second switch element, the third switch element, and the second capacitor.

10. The pixel circuit of claim 9, wherein in a first sensing period, the driving element, the first switch element, the third switch element, and the fifth switch element are configured to be turned on, and the second switch element, the fourth switch element, and the sixth switch element are configured to be turned off.

11. The pixel circuit of claim 10, wherein in a second sensing period following the first sensing period, the driving element, the second switch element, and the fifth switch element are configured to be turned on, and the first switch element, the third switch element, the fourth switch element, and the sixth switch element are configured to be turned off.

12. The pixel circuit of claim 11, wherein a period in which the third switch element is configured to be turned on partially overlaps with a period in which the second switch element is configured to be turned on.

13. The pixel circuit of claim 10, wherein in a second sensing period following the first sensing period, the driving element, the second switch element, and the sixth switch element are configured to be turned on, and the first switch element, the third switch element, the fourth switch element, and the fifth switch element are configured to be turned off.

14. The pixel circuit of claim 8, further comprising:

a fourth switch element connected between the third node and the reference voltage line;

a seventh switch element connected between the third node and a light emitting element; and a third capacitor connected between the third node and a second high-potential voltage line, wherein the first node is connected to the gate of the driving element, the fifth switch element, the sixth switch element, and the first capacitor, wherein the second node is connected to the driving element, the first switch element, and the second switch element, wherein the third node is connected to the first switch element, the fourth switch element, the seventh switch element, the first capacitor, the second capacitor, and the third capacitor, and wherein the fourth node is connected to the second switch element, the third switch element, and the second capacitor.

15. The pixel circuit of claim 14, wherein in a first sensing period, the driving element, the first switch element, the third switch element, the fifth switch element, and the seventh switch element are configured to be turned on, and the second switch element, the fourth switch element, and the sixth switch element are configured to be turned off.

16. The pixel circuit of claim 15, wherein in a second sensing period following the first sensing period, the driving element, the second switch element, and the fifth switch element are configured to be turned on, and the first switch element, the third switch element, the fourth switch element, the sixth switch element, and the seventh switch element are configured to be turned off.

17. The pixel circuit of claim 15, wherein in a second sensing period following the first sensing period, the driving element, the second switch element, and the sixth switch element are configured to be turned on, and the first switch element, the third switch element, the fourth switch element, the fifth switch element, and the seventh switch element are configured to be turned off.

18. The pixel circuit of claim 1, wherein, in a first sensing period, the first capacitor is configured to store a threshold voltage of the driving element, and wherein, in a second sensing period following the first sensing period, the first capacitor is configured to store the threshold voltage compensated by a compensation voltage.

19. The pixel circuit of claim 18, wherein the compensation voltage is determined based on a capacitance of the first capacitor and a capacitance of the second capacitor.

20. A display panel, comprising:

a plurality of pixels configured to display an input image corresponding to a data voltage, each of the plurality of pixels including the pixel circuit of claim 1.

21. The pixel circuit of claim 1, wherein:

the second electrode of the driving element is connected directly to the second node, the first switch element includes a first electrode connected directly to the second node and a second electrode connected directly to the third node, the second switch element further includes a first electrode connected directly to the second node and a second electrode connected directly to the fourth node, and the third switch element includes a first electrode connected directly to the fourth node and a second electrode connected to the reference voltage line.

22. The pixel circuit of claim 1, wherein:

the high-potential voltage line is configured to receive a high-potential voltage, and the reference voltage line is configured to receive a reference voltage different from the high-potential voltage.

* * * * *